US009587983B1

(12) United States Patent
Ho et al.

(10) Patent No.: US 9,587,983 B1
(45) Date of Patent: Mar. 7, 2017

(54) THERMALLY COMPENSATED OPTICAL PROBE

(71) Applicant: Ondax, Inc., Monrovia, CA (US)

(72) Inventors: Lawrence Ho, Arcadia, CA (US); Frank Havermeyer, La Verne, CA (US); Christophe Moser, Pasadena, CA (US); James Carriere, La Crescenta, CA (US); Eric Maye, Torrance, CA (US); Randy Heyler, Newport Beach, CA (US)

(73) Assignee: Ondax, Inc., Monrovia, CA (US)

( * ) Notice: Subject to any disclaimer, the term of this patent is extended or adjusted under 35 U.S.C. 154(b) by 0 days.

(21) Appl. No.: 14/860,611

(22) Filed: Sep. 21, 2015

(51) Int. Cl.
| | |
|---|---|
| *G01N 21/25* | (2006.01) |
| *G01J 3/02* | (2006.01) |
| *G01J 3/44* | (2006.01) |
| *G01J 3/06* | (2006.01) |
| *G03H 1/02* | (2006.01) |
| *G02B 5/32* | (2006.01) |
| *G02B 7/00* | (2006.01) |

(52) U.S. Cl.
CPC ............ *G01J 3/0286* (2013.01); *G01J 3/06* (2013.01); *G01J 3/44* (2013.01); *G02B 5/32* (2013.01); *G02B 7/008* (2013.01); *G03H 1/0248* (2013.01)

(58) Field of Classification Search
CPC ...... G01J 3/02; G01J 3/44; G01J 3/06; G03H 1/02; G02B 5/32; G02B 7/00
See application file for complete search history.

(56) References Cited

U.S. PATENT DOCUMENTS

| 3,588,254 A | 6/1971 | Rhoades et al. |
| 3,588,738 A | 6/1971 | Goodwin et al. |
| 3,659,947 A | 5/1972 | Neumann et al. |
| (Continued) | | |

FOREIGN PATENT DOCUMENTS

| DE | 4214014 | 11/1992 |
| DE | 102012203717 | 3/2013 |

OTHER PUBLICATIONS

Non-Final Office Action, Nov. 20, 2006, U.S. Appl. No. 11/092,149, filed Mar. 28, 2005.
(Continued)

*Primary Examiner* — Abdullahi Nur
(74) *Attorney, Agent, or Firm* — Carr & Ferrell LLP

(57) ABSTRACT

Systems and methods are provided herein. An exemplary system may include a laser source, the laser source having a laser center wavelength; at least one narrowband optical element receiving light emitted by the laser, the narrowband optical element having a filter center wavelength, the narrowband optical element being arranged such that the filter center wavelength is initially spectrally aligned with the laser center wavelength, the filter center wavelength changing in response to a temperature change such that the filter center wavelength is not substantially aligned with the laser center wavelength; and a passive adjustment mechanism coupled to the narrowband optical element, the passive adjustment mechanism including an actuator, the actuator moving in response to the temperature change, the actuator motion rotating the narrowband optical element, the rotation compensating for the temperature change such that the filter center wavelength and laser center wavelength remain spectrally aligned.

36 Claims, 14 Drawing Sheets

(56) References Cited

U.S. PATENT DOCUMENTS

| | | |
|---|---|---|
| 3,902,135 A | 8/1975 | Terada et al. |
| 4,017,144 A | 4/1977 | Staebler |
| 4,057,408 A | 11/1977 | Pierson et al. |
| 4,103,254 A | 7/1978 | Chikami |
| 4,181,515 A | 1/1980 | Dyott et al. |
| 4,456,328 A | 6/1984 | Arns et al. |
| 4,794,344 A | 12/1988 | Johnson |
| 4,807,950 A | 2/1989 | Glenn et al. |
| 4,824,193 A | 4/1989 | Maeda et al. |
| 4,834,474 A | 5/1989 | George et al. |
| 4,942,583 A | 7/1990 | Nazarathy et al. |
| 5,042,898 A | 8/1991 | Morey et al. |
| 5,107,365 A | 4/1992 | Ota |
| 5,115,344 A | 5/1992 | Jaskie |
| 5,221,957 A | 6/1993 | Jannson et al. |
| 5,315,417 A | 5/1994 | Moss et al. |
| 5,335,098 A | 8/1994 | Leyva et al. |
| 5,388,173 A | 2/1995 | Glenn |
| 5,432,623 A | 7/1995 | Egan et al. |
| 5,440,669 A | 8/1995 | Rakuljic et al. |
| 5,491,570 A | 2/1996 | Rakuljic et al. |
| 5,499,134 A | 3/1996 | Galvanauskas et al. |
| 5,517,525 A | 5/1996 | Endo et al. |
| 5,594,744 A | 1/1997 | Lefevre et al. |
| 5,625,453 A | 4/1997 | Matsumoto et al. |
| 5,636,304 A | 6/1997 | Mizrahi et al. |
| 5,640,256 A | 6/1997 | De Vre et al. |
| 5,657,121 A | 8/1997 | Nishina |
| 5,684,611 A | 11/1997 | Rakuljic et al. |
| 5,691,989 A | 11/1997 | Rakuljic et al. |
| 5,771,250 A | 6/1998 | Shigehara et al. |
| 5,796,096 A | 8/1998 | Rakuljic et al. |
| 5,844,700 A | 12/1998 | Jeganathan et al. |
| 5,917,648 A | 6/1999 | Harker |
| 5,943,128 A | 8/1999 | Slater |
| 5,960,133 A | 9/1999 | Tomlinson |
| 5,966,391 A | 10/1999 | Zediker et al. |
| 6,044,285 A | 3/2000 | Chaiken et al. |
| 6,049,554 A | 4/2000 | Lang et al. |
| 6,100,975 A | 8/2000 | Smith et al. |
| 6,101,301 A | 8/2000 | Engelberth et al. |
| 6,139,146 A | 10/2000 | Zhang |
| 6,147,341 A | 11/2000 | Lemaire et al. |
| 6,169,829 B1 | 1/2001 | Laming et al. |
| 6,192,062 B1 | 2/2001 | Sanchez-Rubio et al. |
| 6,211,976 B1 | 4/2001 | Popovich et al. |
| 6,221,535 B1 | 4/2001 | Cox et al. |
| 6,226,084 B1 | 5/2001 | Tormod |
| 6,249,624 B1 | 6/2001 | Putnam et al. |
| 6,281,974 B1 | 8/2001 | Scheiner et al. |
| 6,304,687 B1 | 10/2001 | Inoue et al. |
| 6,327,283 B1 | 12/2001 | Hung |
| 6,327,292 B1 | 12/2001 | Sanchez-Rubio et al. |
| 6,339,504 B1 | 1/2002 | Oliva |
| 6,339,609 B2 | 1/2002 | Lefevre |
| 6,356,684 B1 | 3/2002 | Patterson et al. |
| 6,363,187 B1 | 3/2002 | Fells et al. |
| 6,370,310 B1 | 4/2002 | Jin et al. |
| 6,396,982 B1 | 5/2002 | Lin |
| 6,414,973 B1 | 7/2002 | Hwu et al. |
| 6,449,097 B1 | 9/2002 | Zhu et al. |
| 6,498,872 B2 | 12/2002 | Bouevitch et al. |
| 6,498,891 B1 | 12/2002 | Montesanto et al. |
| 6,507,693 B2 | 1/2003 | Maron et al. |
| 6,512,618 B1 | 1/2003 | Heflinger |
| 6,568,220 B1 | 5/2003 | Paek et al. |
| 6,586,141 B1 | 7/2003 | Efimov et al. |
| 6,587,180 B2 | 7/2003 | Wang et al. |
| 6,606,152 B2 | 8/2003 | Littau et al. |
| 6,621,957 B1 | 9/2003 | Sullivan et al. |
| 6,628,862 B1 | 9/2003 | Yao |
| 6,670,079 B1 | 12/2003 | Kitamura et al. |
| 6,673,497 B2 | 1/2004 | Efimov et al. |
| 6,714,309 B2 | 3/2004 | May |
| 6,750,996 B2 | 6/2004 | Jagt et al. |
| 6,768,577 B2 | 7/2004 | Namiki et al. |
| 6,788,849 B1 | 9/2004 | Pawluczyk |
| 6,822,218 B2 | 11/2004 | Helmig et al. |
| 6,828,262 B2 | 12/2004 | Borrelli et al. |
| 6,829,067 B2 | 12/2004 | Psaltis et al. |
| 6,844,946 B2 | 1/2005 | Buse et al. |
| 6,847,763 B2 | 1/2005 | Eggleton et al. |
| 6,879,441 B1 | 4/2005 | Mossberg |
| 6,904,200 B2 | 6/2005 | Wang et al. |
| 6,934,060 B2 | 8/2005 | Psaltis |
| 6,987,907 B2 | 1/2006 | Psaltis et al. |
| 6,992,805 B2 | 1/2006 | Ingwall et al. |
| 7,002,697 B2 | 2/2006 | Domash et al. |
| 7,031,573 B2 | 4/2006 | Volodin et al. |
| 7,081,977 B2 | 7/2006 | Kim |
| 7,081,978 B2 | 7/2006 | Chen |
| 7,125,632 B2 | 10/2006 | Volodin et al. |
| 7,136,206 B2 | 11/2006 | Psaltis et al. |
| 7,173,950 B2 | 2/2007 | Hand et al. |
| 7,212,554 B2 | 5/2007 | Zucker et |
| 7,245,369 B2 | 7/2007 | Wang et al. |
| 7,245,407 B2 | 7/2007 | Komma |
| 7,248,617 B2 | 7/2007 | Volodin et al. |
| 7,248,618 B2 | 7/2007 | Volodin et al. |
| 7,273,683 B2 | 9/2007 | Volodin et al. |
| 7,298,771 B2 | 11/2007 | Volodin et al. |
| 7,355,768 B1 | 4/2008 | Billmers et al. |
| 7,359,046 B1 | 4/2008 | Steckman et al. |
| 7,359,420 B2 | 4/2008 | Shchegrov et al. |
| 7,372,565 B1 | 5/2008 | Holden et al. |
| 7,391,703 B2 | 6/2008 | Volodin et al. |
| 7,397,837 B2 | 7/2008 | Volodin et al. |
| 7,398,119 B2 | 7/2008 | Lambert et al. |
| 7,424,185 B2 | 9/2008 | Glebov et al. |
| 7,477,818 B2 | 1/2009 | Volodin et al. |
| 7,483,190 B2 | 1/2009 | Psaltis et al. |
| 7,528,385 B2 | 5/2009 | Volodin et al. |
| 7,542,639 B2 | 6/2009 | Moser et al. |
| 7,545,844 B2 | 6/2009 | Volodin et al. |
| 7,548,313 B2 | 6/2009 | Nguyen |
| 7,570,320 B1 | 8/2009 | Anderson et al. |
| 7,590,162 B2 | 9/2009 | Volodin et al. |
| 7,605,911 B2 | 10/2009 | Wieloch et al. |
| 7,633,985 B2 | 12/2009 | Volodin et al. |
| 7,636,376 B2 | 12/2009 | Moser et al. |
| 7,639,718 B1 | 12/2009 | Moser et al. |
| 7,667,882 B2 | 2/2010 | Adibi et al. |
| 7,697,589 B2 | 4/2010 | Volodin et al. |
| 7,719,675 B2 | 5/2010 | Grygier et al. |
| 7,746,480 B2 | 6/2010 | Ozcan et al. |
| 7,792,003 B2 | 9/2010 | Volodin et al. |
| 7,796,673 B2 | 9/2010 | Volodin et al. |
| 7,817,888 B2 | 10/2010 | Volodin et al. |
| 7,822,347 B1 | 10/2010 | Brennan, III et al. |
| 7,830,507 B2 | 11/2010 | Brady et al. |
| 7,986,407 B2 | 7/2011 | Moser et al. |
| 8,049,885 B1 | 11/2011 | Moser et al. |
| 8,139,212 B2 | 3/2012 | Moser et al. |
| 8,184,285 B2 | 5/2012 | Moser et al. |
| 8,369,017 B2 | 2/2013 | Moser et al. |
| 8,384,992 B2 | 2/2013 | Moser et al. |
| 9,097,896 B2 | 8/2015 | Moser et al. |
| 2001/0050751 A1 | 12/2001 | Banyai et al. |
| 2001/0055094 A1 | 12/2001 | Zhang |
| 2002/0012377 A1 | 1/2002 | Suganuma et al. |
| 2002/0015376 A1 | 2/2002 | Liu et al. |
| 2002/0045104 A1 | 4/2002 | Efimov et al. |
| 2002/0093701 A1 | 7/2002 | Zhang et al. |
| 2002/0141063 A1 | 10/2002 | Petrov et al. |
| 2002/0154315 A1 | 10/2002 | Myrick |
| 2002/0176457 A1* | 11/2002 | DeCusatis ............ H04B 10/572 372/26 |
| 2002/0181035 A1 | 12/2002 | Donoghue |
| 2003/0007202 A1 | 1/2003 | Moser et al. |
| 2003/0011833 A1 | 1/2003 | Yankov et al. |
| 2003/0072336 A1 | 4/2003 | Senapati et al. |
| 2003/0128370 A1 | 7/2003 | De Lega |
| 2003/0156607 A1 | 8/2003 | Lipson et al. |
| 2003/0165639 A1 | 9/2003 | Park |

(56) References Cited

U.S. PATENT DOCUMENTS

| | | | |
|---|---|---|---|
| 2003/0169787 | A1 | 9/2003 | Vurgaftman et al. |
| 2003/0190121 | A1 | 10/2003 | Luo et al. |
| 2003/0210863 | A1 | 11/2003 | Myers et al. |
| 2003/0231305 | A1 | 12/2003 | Zeng |
| 2004/0021920 | A1 | 2/2004 | Psaltis |
| 2004/0127778 | A1 | 7/2004 | Lambert et al. |
| 2004/0165639 | A1 | 8/2004 | Lang et al. |
| 2004/0191637 | A1 | 9/2004 | Steckman et al. |
| 2004/0253751 | A1 | 12/2004 | Salnik et al. |
| 2004/0258356 | A1 | 12/2004 | Brice et al. |
| 2005/0018743 | A1 | 1/2005 | Volodin et al. |
| 2005/0129072 | A1 | 6/2005 | Tayebati et al. |
| 2005/0196876 | A1 | 9/2005 | Chan et al. |
| 2005/0206984 | A1 | 9/2005 | Kawano et al. |
| 2005/0226636 | A1 | 10/2005 | Hiramatsu et al. |
| 2005/0248819 | A1 | 11/2005 | Hymel et al. |
| 2005/0248820 | A1 | 11/2005 | Moser et al. |
| 2005/0270607 | A1 | 12/2005 | Moser et al. |
| 2005/0275837 | A1 | 12/2005 | Zhang et al. |
| 2006/0014799 | A1 | 1/2006 | Whittle et al. |
| 2006/0029120 | A1 | 2/2006 | Mooradian et al. |
| 2006/0098258 | A1 | 5/2006 | Chen |
| 2006/0114955 | A1 | 6/2006 | Steckman |
| 2006/0156241 | A1 | 7/2006 | Psaltis et al. |
| 2006/0251143 | A1 | 11/2006 | Volodin et al. |
| 2006/0256830 | A1 | 11/2006 | Volodin et al. |
| 2006/0280209 | A1 | 12/2006 | Treusch et al. |
| 2007/0047608 | A1 | 3/2007 | Volodin et al. |
| 2007/0064304 | A1 | 3/2007 | Brennan et al. |
| 2007/0160325 | A1 | 7/2007 | Son et al. |
| 2007/0279627 | A1 | 12/2007 | Tack et al. |
| 2010/0027001 | A1 | 2/2010 | Moser et al. |
| 2010/0103489 | A1 | 4/2010 | Moser et al. |
| 2010/0110429 | A1 | 5/2010 | Simoni et al. |
| 2010/0149647 | A1 | 6/2010 | Figueroa et al. |
| 2011/0216316 | A1 | 9/2011 | Moser et al. |
| 2011/0216384 | A1 | 9/2011 | Moser et al. |
| 2012/0002197 | A1 | 1/2012 | Moser et al. |
| 2012/0044554 | A1 | 2/2012 | Moser et al. |
| 2012/0085900 | A1 | 4/2012 | Verbeck |
| 2012/0200851 | A1 | 8/2012 | Wu et al. |

OTHER PUBLICATIONS

Final Office Action, Nov. 17, 2008, U.S. Appl. No. 11/092,149, filed Mar. 28, 2005.
Non-Final Office Action, May 13, 2009, U.S. Appl. No. 11/092,149, filed Mar. 28, 2005.
Final Office Action, Nov. 25, 2009, U.S. Appl. No. 11/092,149, filed Mar. 28, 2005.
Final Office Action, May 24, 2010, U.S. Appl. No. 11/092,149, filed Mar. 28, 2005.
Advisory Action, Aug. 10, 2011, U.S. Appl. No. 11/092,149, filed Mar. 28, 2005.
Non-Final Office Action, Jun. 19, 2013, U.S. Appl. No. 11/092,149, filed Mar. 28, 2005.
Final Office Action, Apr. 29, 2010, U.S. Appl. No. 11/093,135, filed Mar. 28, 2005.
Non-Final Office Action, Sep. 28, 2009, U.S. Appl. No. 11/093,135, filed Mar. 28, 2005.
Final Office Action, Apr. 7, 2009, U.S. Appl. No. 11/093,135, filed Mar. 28, 2005.
Non-Final Office Action, Sep. 18, 2008, U.S. Appl. No. 11/093,135, filed Mar. 28, 2005.
Final Office Action, Feb. 22, 2008, U.S. Appl. No. 11/093,135, filed Mar. 28, 2005.
Non-Final Office Action, Aug. 23, 2007, U.S. Appl. No. 11/093,135, filed Mar. 28, 2005.
Non-Final Office Action, Feb. 28, 2007, U.S. Appl. No. 11/093,135, filed Mar. 28, 2005.
Non-Final Office Action, Aug. 3, 2012, U.S. Appl. No. 12/074,784, filed Mar. 6, 2008.
Final Office Action, Dec. 28, 2010, U.S. Appl. No. 12/074,784, filed Mar. 6, 2008.
Non-Final Office Action, Aug. 5, 2010, U.S. Appl. No. 12/074,784, filed Mar. 6, 2008.
Notice of Allowance, Aug. 17, 2011, U.S. Appl. No. 12/454,279, filed May 15, 2009.
Final Office Action, Apr. 18, 2011, U.S. Appl. No. 12/454,279, filed May 15, 2009.
Non-Final Office Action, Nov. 3, 2010, U.S. Appl. No. 12/454,279, filed May 15, 2009.
Notice of Allowance, May 26, 2011, U.S. Appl. No. 12/315,470, filed Dec. 3, 2008.
Non-Final Office Action, Dec. 22, 2010, U.S. Appl. No. 12/315,470, filed Dec. 3, 2008.
Notice of Allowance, Oct. 17, 2012, U.S. Appl. No. 12/460,060, filed Jul. 13, 2009.
Final Office Action, Jun. 13, 2012, U.S. Appl. No. 12/460,060, filed Jul. 13, 2009.
Non-Final Office Action, Dec. 28, 2011, U.S. Appl. No. 12/460,060, filed Jul. 13, 2009.
Notice of Allowance, Nov. 14, 2011, U.S. Appl. No. 13/115,080, filed May 24, 2011.
Non-Final Office Action, Jul. 15, 2011, U.S. Appl. No. 13/115,080, filed May 24, 2011.
Non-Final Office Action, Jun. 2, 2014, U.S. Appl. No. 13/115,075, filed May 24, 2011.
Notice of Allowance, Feb. 9, 2015, U.S. Appl. No. 13/115,075, filed May 24, 2011.
Non-Final Office Action, Dec. 31, 2012, U.S. Appl. No. 12/069,356, filed Feb. 8, 2008.
Final Office Action, Mar. 21, 2011, U.S. Appl. No. 12/069,356, filed Feb. 8, 2008.
Non-Final Office Action, Jul. 6, 2010, U.S. Appl. No. 12/069,356, filed Feb. 8, 2008.
Notice of Allowance, Mar. 8, 2012, U.S. Appl. No. 13/157,265, filed Jun. 9, 2011.
Notice of Allowance, Dec. 21, 2012, U.S. Appl. No. 13/281,655, filed Oct. 26, 2011.
Final Office Action, Jul. 24, 2012, U.S. Appl. No. 13/281,655, filed Oct. 26, 2011.
Non-Final Office Action, Feb. 1, 2012, U.S. Appl. No. 13/281,655, filed Oct. 26, 2011.
Final Office Action, Sep. 24, 2014, U.S. Appl. No. 14/044,773, filed Oct. 2, 2013.
Non-Final Office Action, Mar. 25, 2014, U.S. Appl. No. 14/044,773, filed Oct. 2, 2013.
Advisory Action, Dec. 11, 2014, U.S. Appl. No. 14/044,773, filed Oct. 2, 2013.
Non-Final Office Action, Feb. 25, 2015, U.S. Appl. No. 14/044,773, filed Oct. 2, 2013.
Final Office Action, Oct. 2, 2015, U.S. Appl. No. 14/044,773, filed Oct. 2, 2013.
Askins, "Fiber Bragg refractors prepared by a single excimer pulse," Opt. Lett., vol. 17(11), pp. 833-835 (1992).
Bochove, E.J. et al. "Theory of Spectral Beam Combining of Fiber Lasers," IEEE J. Quant. Elec., 38:5 (2002).
Bosomworth et al. "Thick holograms in photochromic material" Applied Optics [Online] 1968, 7(1), Abstract.
Burr, Geoffrey et al. "Angle and Space Multiplexed Holographic Storage Using the 90 degree Geometry," Optics Comm. 117 (1995).
Curtis, Kevin et al. "Cross Talk for Angle- and Wavelength-Multiplexed Image Plane Holograms," Optics Letters. vol. 19 (21) (1994).
Daneu, V. et al. "Spectral Beam Combining of a Broad-Stripe Diode Laser Array in an External Cavity," Opt. Lett. 25:6 (2000).
Dos Santos, Paulo et al. "Interference-term Real-time Measurement for Self-stablized Two-wave Mixing in Photorefractive Crystals," Optics Letters, Nov. 1988, vol. 13, No. 11, pp. 1014-1016.
Erdei et al. "Optimization method for the design of beam shaping systems" Optical Engineering [Online] 2002, 41, Abstract.
Ford, Joseph et al. "Wavelength Add-Drop Switching Using Tilting Micromirrors," Journal of Lightwave Technology, vol. 17, No. 5 (May 1999).

(56) References Cited

OTHER PUBLICATIONS

Frejlich, Jamie et al. "Analysis of an Active Stablization System for a Holographic Setup," Applied Optics, May 15, 1988, vol. 27, No. 10, pp. 1967-1976.
Goodman, Joseph W. "Introduction to Fourier Optics," 1968, pp. 198-224.
Havermeyer, Frank et al. "Volume Holographic Grating-Based Continuously Tunable Optical Filter," Opt. Eng. 43(9), Sep. 2004, pp. 2017-2021.
Heaney et al., "Sol-gel derived photosensitive germanosilicate glass monoliths," Opt. Lett., vol. 25(24), pp. 1765-1767 (Dec. 2000).
Hill, "Photosensitivity in optical fiber waveguides: Application to reflection filter fabrication," Appl. Opt. Lett. vol. 32(10), pp. 647-649 (1978).
Hill, "Simple Transient Holograms in Ruby," Appl. Opt., vol. 10(7), pp. 1695-1697 (1971).
In re Rose, 220 F.2d 459, 105 USPQ 237-241 (CCPA 1955).
Kogelnik, Herwig. "Coupled Wave Theory for Thick Hologram Gratings," The Bell System Tech. Journal, Nov. 1969, vol. 48, No. 9, pp. 2909-2947.
Levene, Michael et al. "Method for Controlling the Shift Invairance of Optical Correlators," Applied Optics, Jan. 10, 1999, vol. 38, No. 2, pp. 394-398.
Li, Lijun et al. "Experimental Studies on Narrow-Linewidth YB3+-Doped Double-Clad Fiber-Laser Cavities Based on Double-Clad Fiber Bragg Gratings," Microwave and Optical Technology Letters, 44(1):53-56 (2005).
Littman, Michael G. "Singlemode Operation Grazing-Incidence Pulsed Dye Laser," Optics Letters, Oct. 1978, vol. 3, pp. 138-140.
Mill, P. "Single Mode Operation of a 1.55 Micrometer Semiconductor Lasers Using a Volume Holographic Grating," Jul. 1985, Electronics Letters.
Mitchard, Gordon et al. "Double-Clad Fibers Enable Lasers to Handle High Power," Laser Focus World. Jan. 1999.
Miyazaki, T. et al. "Nd-Doped Double-Clad Fiber Amplifier at 1.06um," Journal of Lightwave Technology, 16(4): 562-566 (Apr. 1998).
Moser, Christophe. "Folded Shift Multiplexing," Optics Letters, vol. 28 (11) (Jun. 2003).
Sadot, D. et al. "Tunable Optical Filters for Dense WDM Networks," IEEE Communications Magazine, 50-55 (1998).
Saleh, B. and M. Teich, "Fundamentals of Photonics," Wiley-Interscience, p. 151, 631-632 (1991).
Shu et al. "More on analyzing the reflection of a laser beam by a deformed highly reflective volume Bragg grating using iteration of the beam propagation method" Applied Optics [Online] 2009, 48 (1), pp. 22-27.
Smith, Warren. "Modern Optical Engineering," 1990, pp. 43-47.
Steckman, Gregory J. et al. "Holographic Data Storage in Phenanthrenequinone Doped PMMA," SPIE Photonics West, San Jose, CA (Jan. 27, 1999).
Steckman, Gregory J. et al. "Holographic Multiplexing in Photorefractive Polymers," Optics Communications, Nov. 1, 2000, 185, pp. 13-17.
Steckman, Gregory J. et al. "Storage Density of Shift-Multiplexed Holographic Memory," Applied Optics, Jul. 10, 2001, vol. 40, No. 20, pp. 3387-3394.
Venus, George et al. "Semiconductor 1.7 W Volume Bragg Laser with Divergence Close to a Diffraction Limit," 26th Annual Conference on Lasers and Electro-Optics. CLEO/IQES and PhAST Technical Digest, Paper Code CFG4, Long Beach, CA, May 2006.
Volodin, B.L. et al. "Wavelength Stabilization and Spectrum Narrowing of High-Power Multimode Laser Diodes and Arrays by Use of Volume Bragg Gratings," Optics Letters, vol. 29, No. 16 (Aug. 15, 2004).
Yiou, Silvie et al. "Improvement of the Spatial Beam Quality of Laser Sources with an Intracavity Bragg Grating," Opt. Lett, 28 (4), 242 (2003).
Zorabedian, Paul. "Tunable Lasers Handbook—tunable external-davity semi-conductor lasers," Chapter 8, Academic Press (1995).
Laux et al. "Holographic bulk grating photopolymer for pulse stretching in a CPA laser," CLEO Europe (2007).

\* cited by examiner

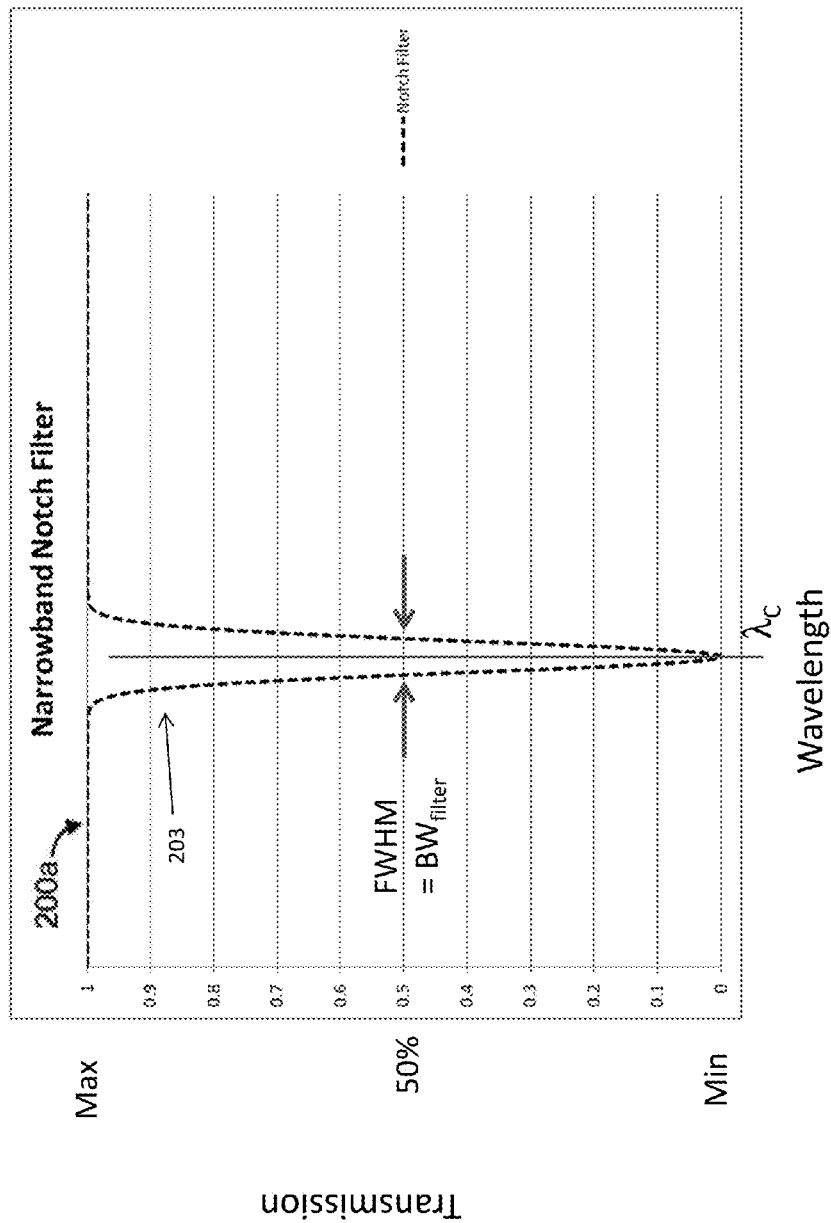

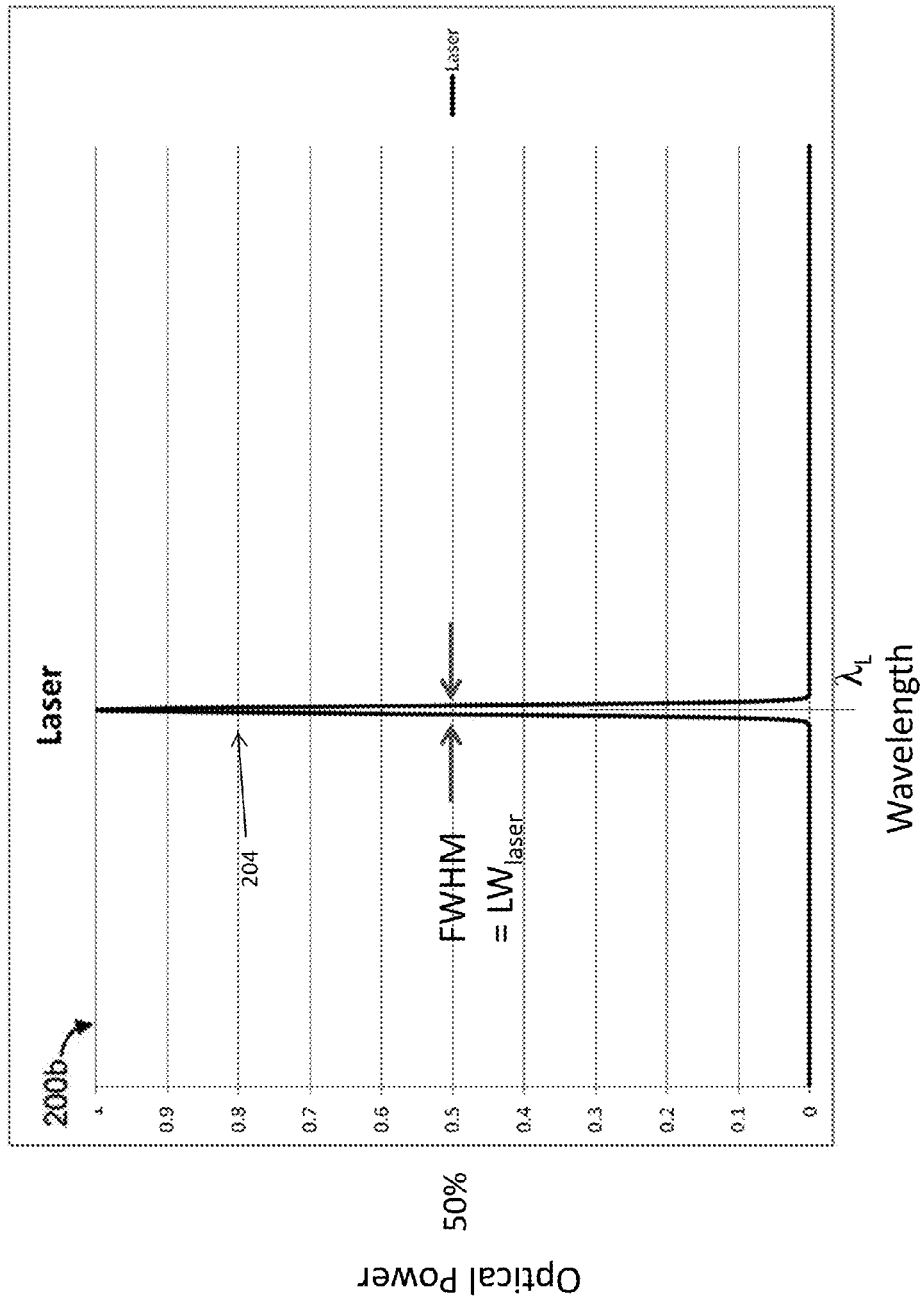

Bandpass Filter (Beamsplitter) Profile

Notch Filter Profile

VHG Filter performance vs. Temp. and Angle

Narrowband (Bragg) filter wavelength $\lambda_c$ as a function of temperature change $\Delta T$ at fixed angle of incidence. $\alpha$ is the effective linear expansion coefficient.

Narrowband (Bragg) wavelength $\lambda_c$ as a function of angle of incidence $\Theta$ at constant temperature.

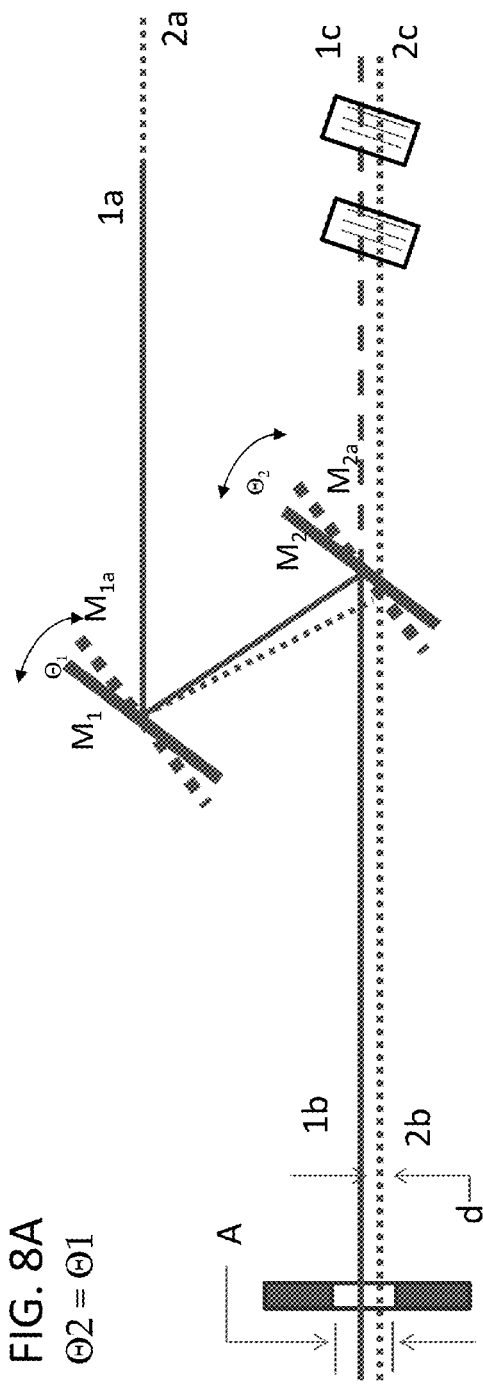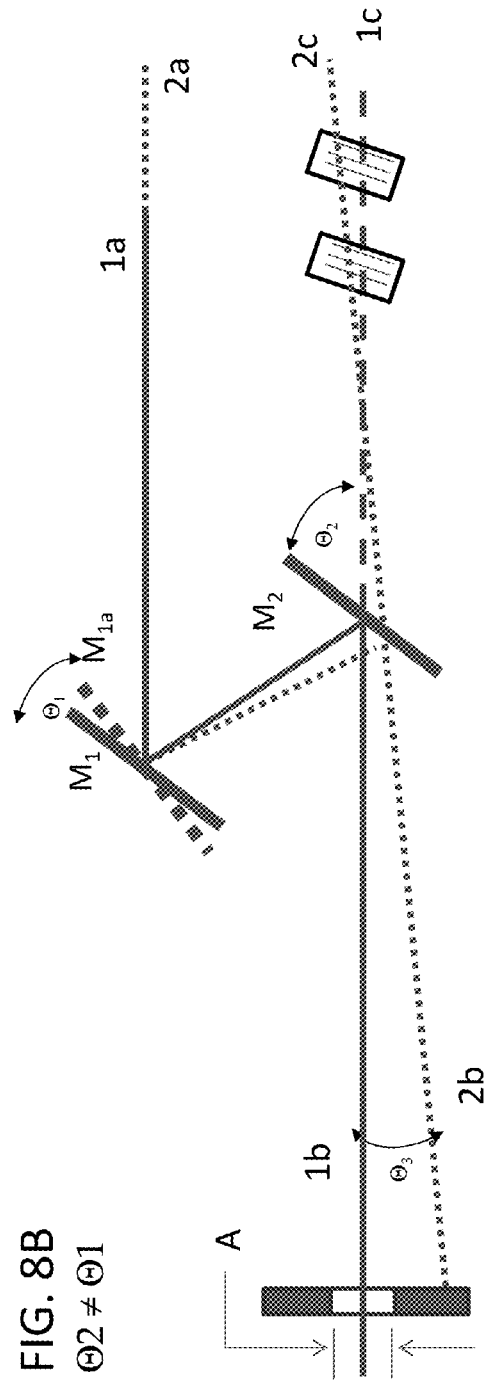
FIG. 8A
Θ2 = Θ1
FIG. 8B
Θ2 ≠ Θ1

US 9,587,983 B1

THERMALLY COMPENSATED OPTICAL PROBE

TECHNICAL FIELD

The present technology pertains generally to optical and spectroscopic measurement, and more specifically to Raman spectroscopy.

BACKGROUND OF THE INVENTION

Thermal effects often lead to changes optical system performance due to shifts in mechanical position of the elements or spectral shifts in optics or light sources such as lasers. Many effects need to be taken into consideration, including mechanical shifts of optical mount positions, thermal expansion and spectral shifts of optical materials, components and coatings, and drifts in emission wavelength of any optical sources in the system.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for compensation of thermal effects in an optical system that uses narrowband optical elements, in particular volume holographic gratings, in optical systems such as a Raman spectroscopy system. In some embodiments, the invention enables an optical probe to simultaneously and continuously capture low frequency and anti-Stokes Raman scattering signals to within very close proximity (for example <10 cm$^{-1}$) of the laser excitation wavelength in extreme environments and over large temperature ranges.

BRIEF DESCRIPTION OF THE DRAWINGS

Embodiments are illustrated by way of example, and not by limitation, in the figures of the accompanying drawings, in which like references indicate similar elements and in which:

FIG. 2A shows an example transmission spectrum of a narrowband optical filter 200a, and FIG. 2B shows an example emission spectrum of a narrowband optical source (laser) 200b, highlighting the spectral center wavelengths $\lambda_C$ and $\lambda_L$ as the midpoints of the full-width half maximum (FWHM) of the respective curves.

FIGS. 8A and 8B illustrate example shifts in angle and displacements of beam path when optical elements are rotated according to some embodiments.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

In the case of spectroscopic instruments, an optical source (e.g., a laser) is used to excite a response by a sample material of interest via either absorption or scattering, and the resulting changes in the optical signal can be used to determine the chemical composition and/or the molecular structure of the sample. Multiple optical elements, including at least one of lasers, filters, beam splitters and gratings, are utilized in such systems (FIG. 1), and a precise spectral calibration reference between each of the elements and as a system overall is used to achieve accurate results. When subjected to changes in temperature, the spectral changes of each element of the system are often different in magnitude, leading to changes in system performance and/or requiring additional recalibration.

Figure 2:
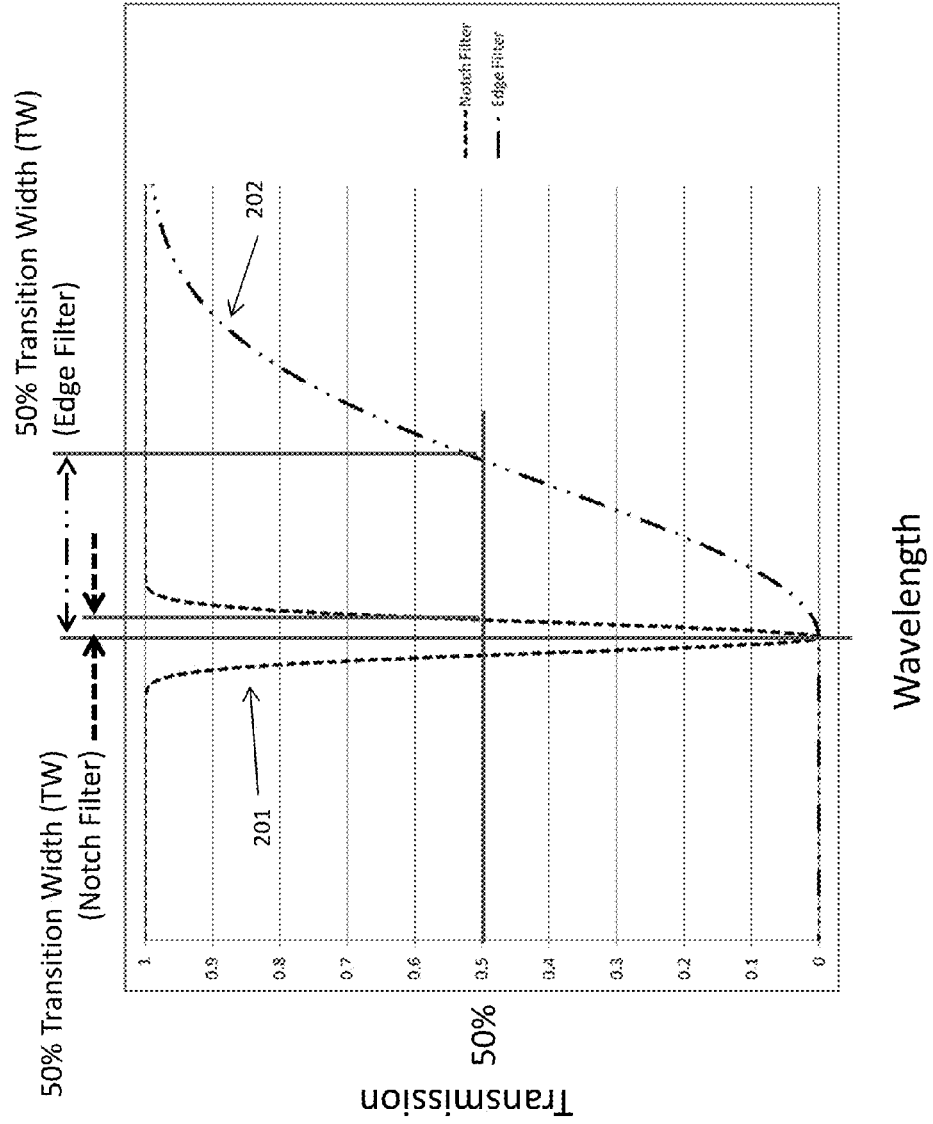
FIG. 2 illustrates the transition width (TW) of a narrowband notch filter to a typical (narrowband) edge filter.

Raman spectroscopy systems can use edge and/or notch filters to remove the laser (e.g., Rayleigh) light from the Raman signal, and these typically have relatively large transition widths that allow for substantial spectral shifts of either or both laser and filters to occur without impairing the ability of the filters to block the Rayleigh light (FIG. 2). However, "low frequency" or "low wavenumber" Raman spectroscopy systems, which offer significant advantages in overall system performance and easy access to important low-frequency and in some embodiments also anti-Stokes signals, utilize designs where one or more of the optical elements is an extremely narrowband thin film edge or notch filter or volume holographic grating (VHG) notch filter. A "narrowband" filter is defined herein as having a 50% transition width of <50 cm$^{-1}$. These systems are much more susceptible to spectral shifts related to changes in temperature, which can impair the ability of the filters to block the Rayleigh signal. They may need the center wavelengths $\lambda_{C1}$, $\lambda_{C2}$, $\lambda_{C3}$, . . . of the narrowband optical elements (also known as the Bragg wavelength for a VHG) to stay spectrally aligned with each other, as well as with the center wavelength $\lambda_L$ of the narrowband optical source (normally a narrowband or single frequency laser), to ensure adequate attenuation of the laser excitation and acceptable performance of the overall optical system (FIGS. 2A-2C, and 2F).

Low-frequency spectroscopy systems typically place all the narrowband optical elements within an enclosure or onto one platform, enabling the elements to remain at the same temperature during operation and thereby maintaining stable spectral alignment, which is critical for system performance. Alternatively (or additionally), the system may be designed so that the center wavelength for all elements (including the laser) changes at the same rate with respect to temperature, so that the center wavelength(s) of all optical elements remain spectrally aligned with respect to one another (or "synchronized"), similarly preserving system performance.

Figure 1:
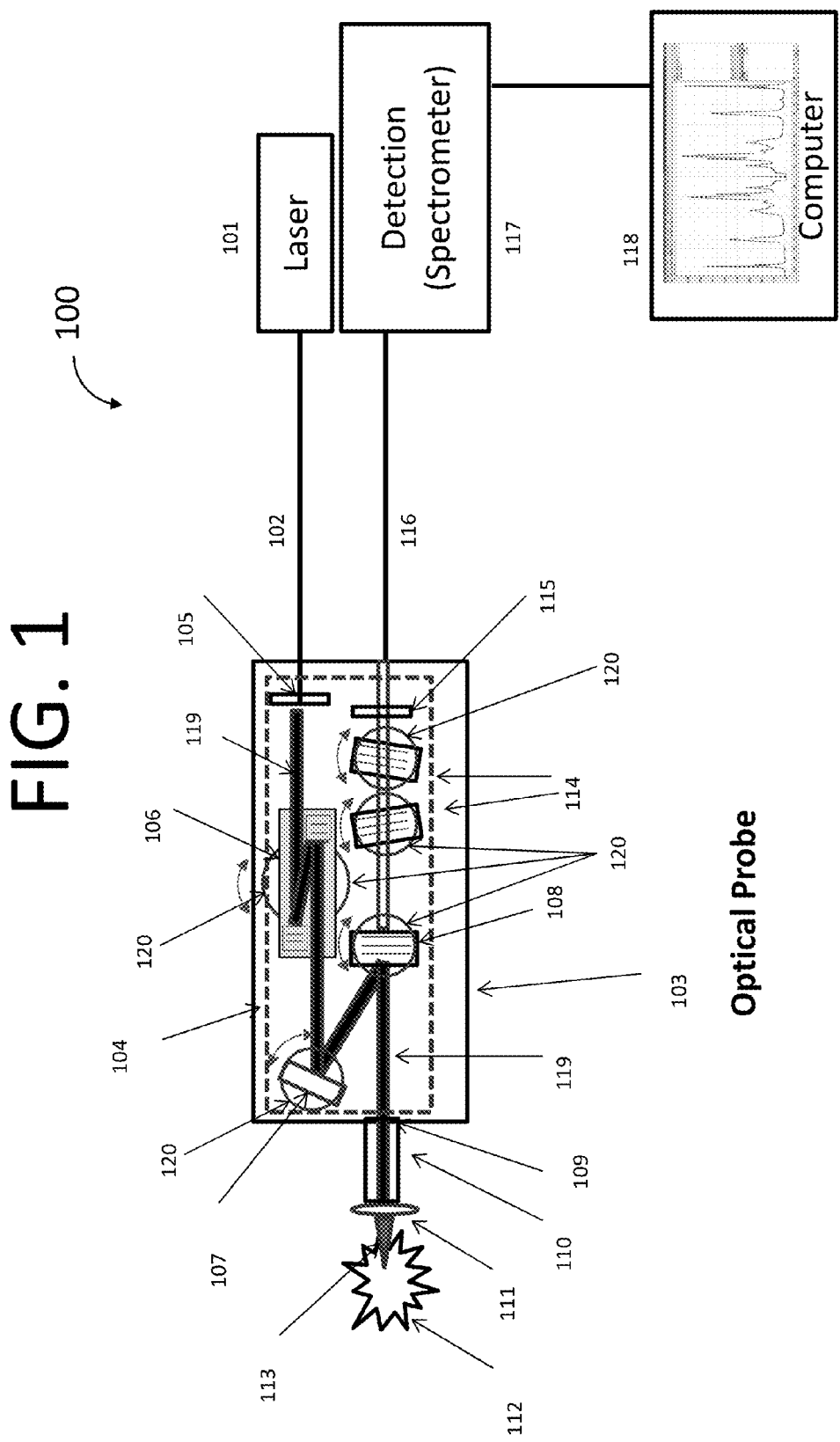
FIG. 1 shows a simplified block diagram of a low frequency Raman spectrometer system, including an optical probe, according to some embodiments.

However, many applications require that at least one of the narrowband optical elements be placed in close proximity to, or in an environment of, significantly higher or lower temperatures than other system elements, and/or subjected to changing temperatures, or may require a separation of the laser excitation source from the rest of the system. Examples include when the system is to be used in or near a vessel, crucible, pipeline, or other location that is unsuitable for the entire system or for the laser and/or other electronic components. Such applications typically require one or more of the narrowband optical elements to be housed in an "optical probe" configuration and remotely connected via fiber optic cable or free space connections to the laser source and other system components such as a spectrometer (FIG. 1).

Alternatively (or additionally), the system may be comprised of components with different wavelength shift rates. In these situations, changes in the temperature of the probe during operation (e.g., relative to initial conditions), as well as differential temperatures between the probe, laser, and/or the rest of the spectrometer system, may lead to spectral misalignments that can drastically reduce or entirely disable system performance.

These spectral shifts may be detected and compensated for using various methods. In some embodiments, using grating or interference-based (e.g. thin-film) filters, spectral alignment can be achieved by tuning the filter(s), for example, via physical movement (e.g. rotation), or by changing the temperature. Measurement of the laser power through the filters as a function of angle or temperature generates a curve that allows for determination of a local maximum (or minimum point), which corresponds to the point at which the "center wavelengths" of both the laser ($\lambda_L$) and filter ($\lambda_C$) are spectrally aligned. In various embodiments, the laser wavelength may be tuned (e.g., via temperature or physical movement of a mirror, grating, prism, etc.), while the filters remain stable in both position and temperature, similarly enabling determination of a center wavelength where the laser and filters are spectrally aligned.

Figure 2C:
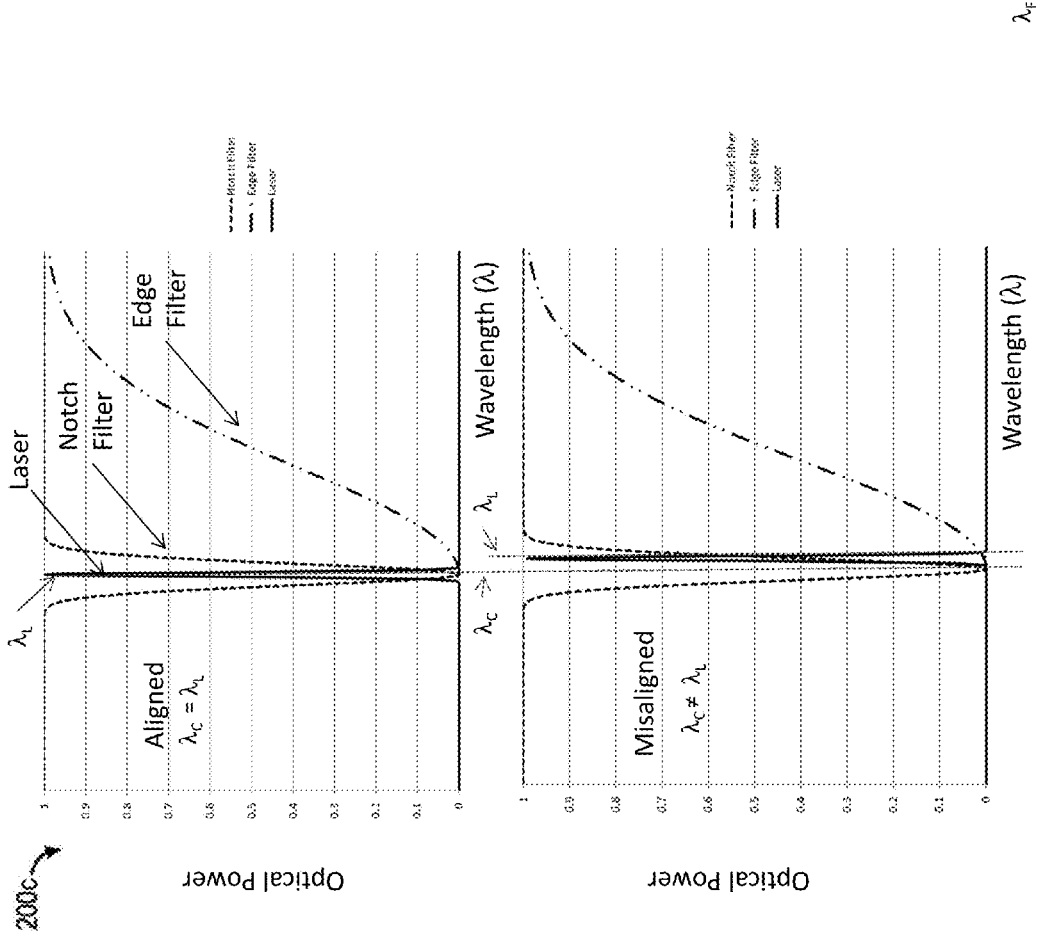
FIG. 2C shows an overlay 200c of the two curves of FIGS. 2A and 2B, demonstrating the constraints for required spectral alignment.

The position (or temperature) of the filters and/or the wavelength of the laser, can be set to their respective optimum values, and spectral alignment is achieved. Spectral alignment is the condition where the center wavelengths of all elements are within an application-dependent range from each other. This range is typically less than the transition width of the individual optical elements (FIG. 2C).

In most cases, "active" control of (e.g., manual or electronic intervention in) one or more of the laser wavelength and filter positions is done to perform these operations for initial calibration, and may be repeated as necessary when temperatures and/or other conditions cause enough shift in center wavelengths of one or more of the elements so as to impact system performance. This type of active intervention may be acceptable in a laboratory instrument used in a controlled environment. However, in many applications (and especially where a fiber-optically coupled probe is required), it is either impractical or entirely unacceptable to allow manual intervention during operation, or to have electrical connections and/or components within the probe itself. Accordingly, some embodiments of the present invention offer several solutions for passively maintaining spectral alignment and synchronization between multiple narrowband optical elements, between the optical probe and the laser, and across the entire optical system, ensuring optimal performance across a wide range of temperature and operating environments.

Embodiments of the present invention described below advantageously maintain a parallel beam path during temperature excursions and do not change the beam angle and limit any beam displacement, which is preferable for many optical systems and in particular a confocal Raman spectroscopy probe geometry.

FIG. 1 is a block diagram of a low-frequency Raman spectroscopy system, according to some embodiments. The system includes a laser source (101), optical probe (103), detection system (117), computer (118), and optical fiber coupling (102 and 116) between elements. Laser 101 is optically coupled to fiber-optic cable 102, which is optically coupled to optical probe 103. Laser 101 may be a narrowband or single frequency laser with a wavelength in the Ultraviolet (UV), visible, or infrared light spectrums (e.g., ~200 nm to ~2,000 nm). By way of non-limiting example, the output power is between 1 mW and 5 W. A plurality of optical elements 104 are disposed in optical probe 103. Optical elements may include at least one of collimating lens 105 (e.g., to create a free space collimated excitation beam (119)), an amplified spontaneous emission (ASE) filter assembly 106 to remove additional spectral noise from the excitation beam, a mirror or narrowband filter 107 to redirect the excitation beam onto the beamsplitter 108, at least one narrowband edge or notch filter (or filters) 114, and a focusing lens 115.

In some embodiments, ASE filter assembly 106, beamsplitter 108 and/or filter 107 may additionally reduce spectral noise from laser 101 and/or generated within fiber 102 (e.g., typical broad band fluorescence and/or Brillouin scattered light that may be generated in the fiber). Beamsplitter 108 may redirect the excitation beam through exit port 109. Excitation beam 119 may pass through an optical enclosure or tube 110 and may be focused via focusing lens 111 onto a sample 112. In various embodiments, backscattered light 113 is reflected back through focusing lens 111, tube 110, and beamsplitter 108, where reflected excitation (e.g., Rayleigh) light may be filtered by the beamsplitter 108.

The reflected/backscattered light (Raman signal plus residual Rayleigh light) optionally passes through one or more additional filtering elements 114, which may include narrowband optical elements such as volume holographic gratings. One or more of elements 114 each is a narrowband optical element or volume holographic grating filter. In exemplary embodiments, the bandwidth of narrowband optical elements 114 is larger than the bandwidth of the narrowband optical elements (106, 107, 108) disposed in the path of the excitation beam.

Each of the narrowband optical elements or assemblies (e.g., 106, 107, 108, and 114) is attached or mounted upon an adjustment mechanism 120 that will induce a change in the angular position of the optical element with any change in temperature according to a predefined relationship.

The reflected light may be refocused via refocusing lens 115 into collection fiber 116 and optically coupled to a detection system 117. In one exemplary embodiment, the detection system is a spectrometer. It can be advantageous to remove sufficient Rayleigh light from the optical beam so that additional fluorescence, Brillouin, or other scattering is not generated in the collection fiber 116. The spectrometer may use a volume phase grating, reflective grating, micromirror array, or other optical element to disperse or redirect the signal onto a charge couple device (CCD) detector or comparable electronic sensor to resolve the optical signal. The optical signal may then be sent to computer 118. Computer 118 may analyse the resolved optical signal by comparing to established spectral libraries or providing data for offline chemometric or numerical analysis.

FIG. 2 shows a comparison of an example transmission curve of a narrowband notch filter 201 and a narrowband edge filter 202. The transition width (TW) is also shown as the spectral width measured between the maximum and 50% transmission points. Narrowband filters herein are those with transition widths of <50 cm$^{-1}$. In some embodiments, example transmission curve 201 is descriptive of at least one of ASE filter assembly 106, mirror or narrowband filter 107, beamsplitter 108, and elements 114.

FIG. 2A shows an example transmission curve 203 of a narrowband optical element 200a, where the spectral centerpoint or filter center wavelength $\lambda_C$ is the midpoint of the full-width half maximum (FWHM) of the filter, also known as bandwidth ($BW_{filter}$). $\lambda_C$ may also be referred to as the Bragg wavelength $\lambda_B$ for VHGs. FIG. 2B shows an example emission curve 204 of a narrowband laser source 200b, where the laser linewidth ($LW_{laser}$) is the full-width half maximum (FWHM) with laser center wavelength $\lambda_L$. In various embodiments, emission curve 204 is descriptive of laser 101 (FIG. 1).

Figure 2E:
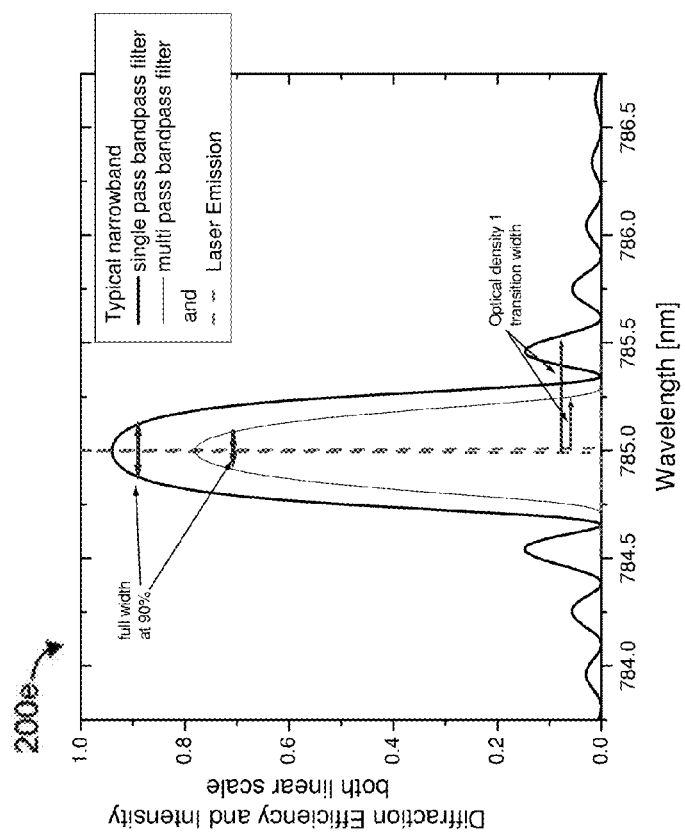
FIGS. 2D and 2E show the transmission curves of a narrowband notch filter and a bandpass filter (e.g., beamsplitter), respectively.
Figure 2D:
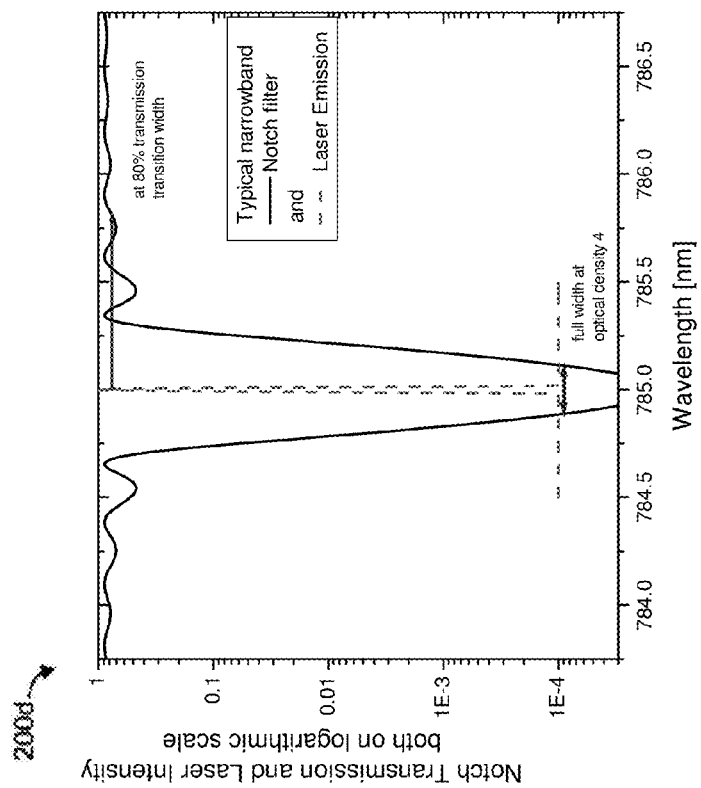
Figure 2F:
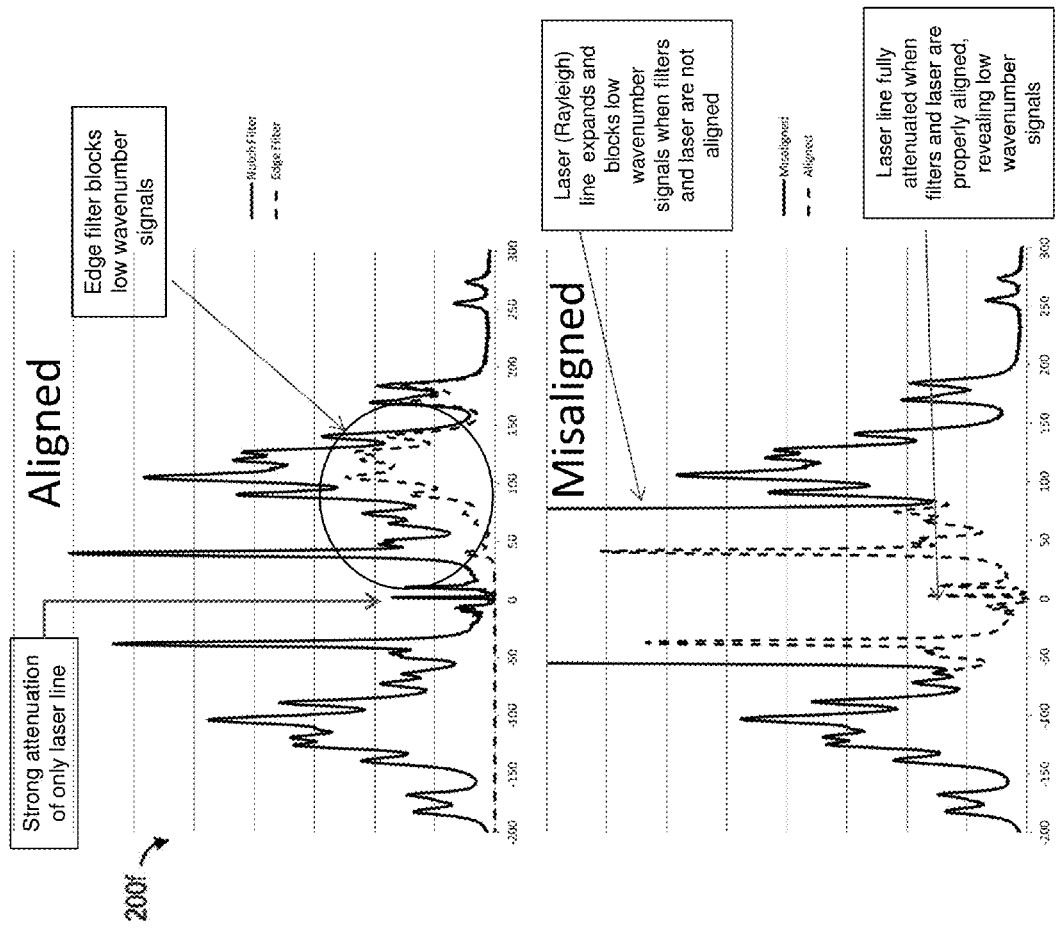
FIG. 2F shows an example comparison of spectra from a well calibrated and spectrally aligned system, and from a spectrally misaligned system.

FIG. 2C shows examples of spectrally aligned and misaligned conditions between the narrowband optical element(s) and laser source. In the aligned condition, $\lambda_C = \lambda_L$, resulting in optimal operation of a low-wavenumber Raman spectroscopy system. In the misaligned condition $\lambda_C \neq \lambda_L$ and Rayleigh scattered light will block some low wavenumber signals and potentially saturate the detector system, preventing reading of additional Raman signals (FIG. 2F). Spectral alignment can be achieved when the following conditions are satisfied: the laser linewidth $LW_{laser}$ is less than the filter transition width ($TW_{filter}$); the spectral misalignment (or wavelength difference) filter, between the center wavelengths of the laser and filter(s) $|\lambda_C - \lambda_L|$ is less than half the difference between the filter transition width TW and the laser linewidth $LW_{laser}$ (condition expressed by equation (1) below); the center wavelengths of all components (laser $\lambda_L$ and narrowband optical elements $\lambda_{C1}, \lambda_{C2}, \lambda_{C3} \ldots$) fulfill the condition expressed by equation (1), and suppression of the amplified spontaneous emission (ASE) of the laser is sufficient to prevent interference with the low frequency Raman signals. These ideal conditions may be expressed as:

$$|\lambda_c - \lambda_L| < \frac{1}{2}(TW_{filter} - LW_{laser}) \quad (1)$$

for any narrowband optical element disposed in the beam path with center wavelengths $\lambda_{C1}, \lambda_{C2}, \lambda_{C3} \ldots$ and transition widths $TW_1, TW_2, TW_3$; and $$\text{ASE suppression} > \sim 60 \text{ dB}. \quad (2)$$

In the case where a narrowband filter element is an edge filter and not a notch filter, the center wavelength $\lambda_C$ is defined as the wavelength where the optical density (OD) is at least OD 4.

Figure 2G:
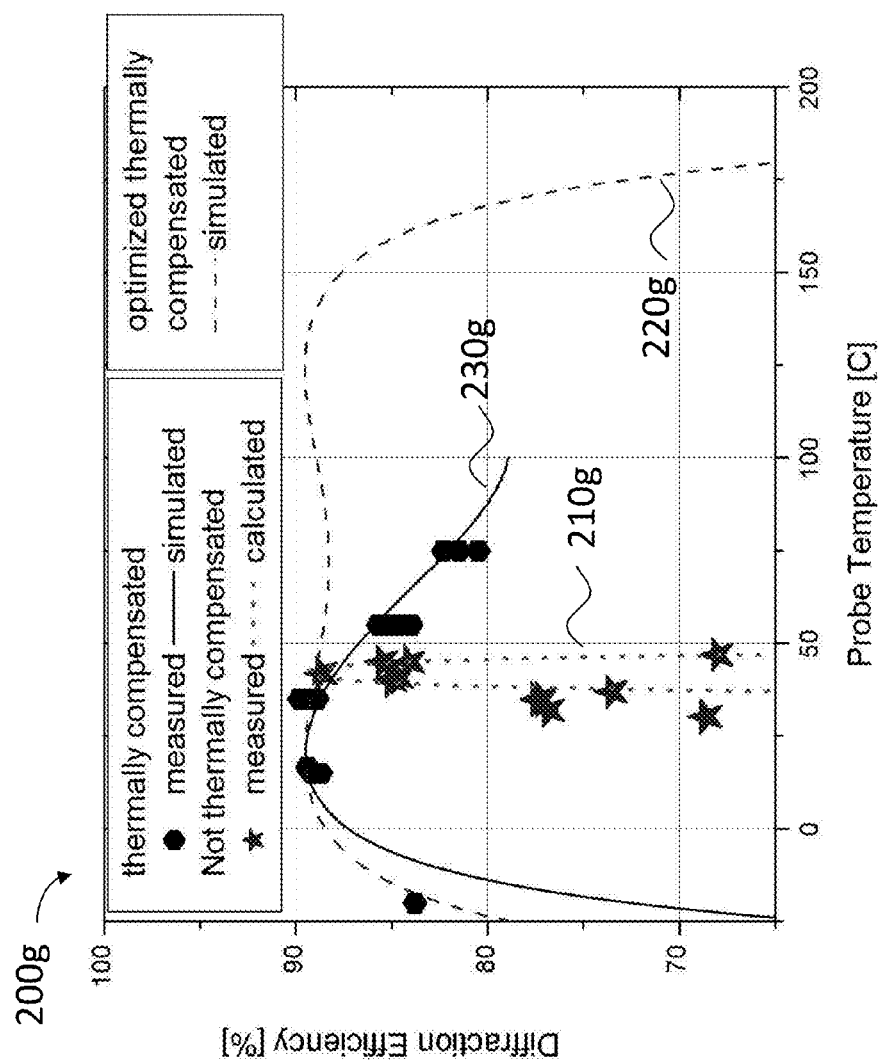
FIG. 2G shows example measured and calculated results of filter performance with and without temperature compensation.

In low frequency Raman spectroscopy systems, the tolerance for shifts of either the center wavelength of a filter or the laser is extremely small compared to traditional Raman systems. Typical tolerance levels for allowable relative shifts between components are on the order of <<10 cm$^{-1}$ and can occur over relatively small temperature ranges, for example less than 10 degrees Celsius in uncompensated systems. It has been shown that temperature shifts of less than 10 degrees Celsius can dramatically affect system performance (FIG. 2G). When spectral shifts occur beyond these limits, the Rayleigh scattered light intensity will grow and eventually may greatly exceed the low frequency Raman signals, and possibly saturate the sensor, preventing identification of low frequency peaks (FIG. 2F). From a practical perspective, the tolerance for center wavelength shift can depend on both the end user application and the function of the narrowband optical element. For example, notch filter(s) or narrowband optical elements 114 reject residual Rayleigh (excitation) wavelength from the backscattered Raman signal with high efficiency, while maintaining high transmission for all other wavelengths. Optical Density, or OD, is often used to describe the performance of an optical filter for Rayleigh rejection. In Raman spectroscopy system 100 (FIG. 1), the cumulative OD (over one or more filters) should be sufficiently high in order to remove enough Rayleigh signal such that the Raman signal may be clearly seen. An OD of greater than 6 is typically required; however the cumulative OD may be achieved via a combination of narrowband filters 114 within the probe and additional notch or narrowband filters disposed in the path of the Raman signal 116 prior to entering the detection system 117. As an example, FIG. 2D shows transmission curve 200d of a single narrowband VHG element, noting the full width where the OD=4. Typically, two or more such filters are used in Raman spectroscopy system 100 for Rayleigh rejection, totalling an OD=8. This "OD4 bandwidth" represents the effective bandwidth of the element for the Raman system, also defining the boundaries within which the excitation laser emission profile should remain for optimal operation over temperature shifts for such filters. The laser emission profile is also shown for comparison on the diagram.

A bandpass filter (e.g., beamsplitter 108 in FIG. 1) preferably reflects a high proportion of the Rayleigh light toward the sample, as well as rejecting it from the backscattered signal. This proportion is commonly referred to as Diffraction Efficiency (DE) for a narrowband VHG filter, and a typical value for a Raman system would be DE=90%. FIG. 2E shows bandwidth 200e at the DE=90% level for both a single and multiple bandpass filter example. Again, the laser excitation (also shown) must remain within this bandwidth for optimal operation during temperature shifts.

FIG. 2F shows an example comparison of spectra 200f from a well calibrated and spectrally aligned system, and from a misaligned system where Rayleigh light is leaking through, preventing the low frequency signals from being seen.

FIG. 2G compares compensated and uncompensated system performance 200g, measured as optical throughput (also referred to as diffraction efficiency for a narrowband VHG pass band filter). The narrow (uncompensated) curve 210g shows a dramatic diffraction efficiency change over relatively small temperature changes, with filter performance dropping from 90% to less than 70% over just 10 or 20 deg. C. However, when passive compensation is implemented, simulations curve 220g shows the temperature over which the filter efficiency remains over 80% is expanded to nearly 200 deg. C. Actual test results 230g show diffraction efficiency can be kept above 80% over a 100 deg. C. span.

Figure 3:
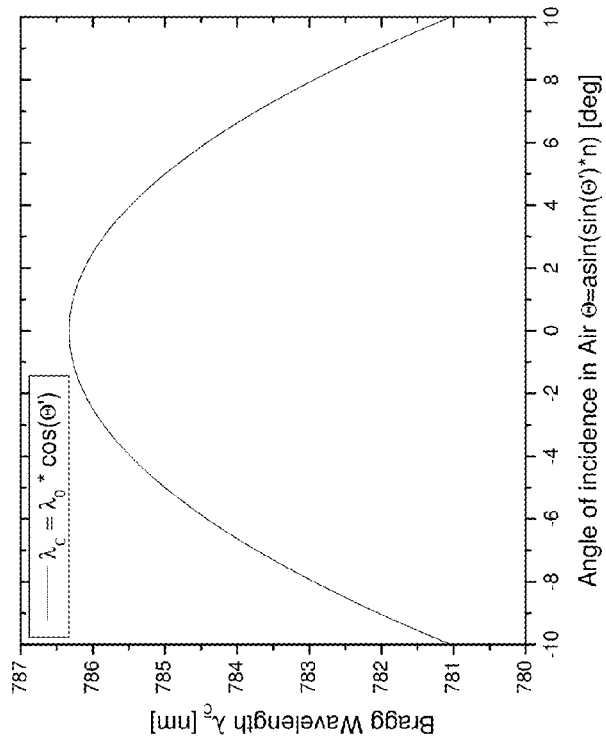
FIG. 3 shows an example shift of center wavelength $\lambda_C$ (or in the case of a volume holographic grating, or VHG, the Bragg wavelength) of a narrowband optical element over temperature.

For embodiments including narrowband elements (e.g., ASE filter assembly 106, narrowband filter 107, beamsplitter 108, and notch filters 114 in FIG. 1), temperature changes can shift the center wavelength (and for VHG filters, the Bragg wavelength) resulting in a change or loss of diffraction efficiency relative to a fixed laser wavelength (FIG. 3). Subsequent shifting of the laser wavelength and/or filter center wavelength can restore any loss. Filter wavelength shifts may be instigated by temperature changes and/or changing the Angle of Incidence (AOI) onto the element. In the case of an external temperature change, the filter may be rotated or tilted, thus changing the AOI to compensate for the temperature induced shift. The filter center wavelength as a function of temperature and angular position (e.g., relative to the optical beam angle of incidence) can be predetermined by either mathematical modelling or empirical measurement, and this relationship may be used to establish a predefined rotational actuation as a function of temperature for system design.

Figure 4:
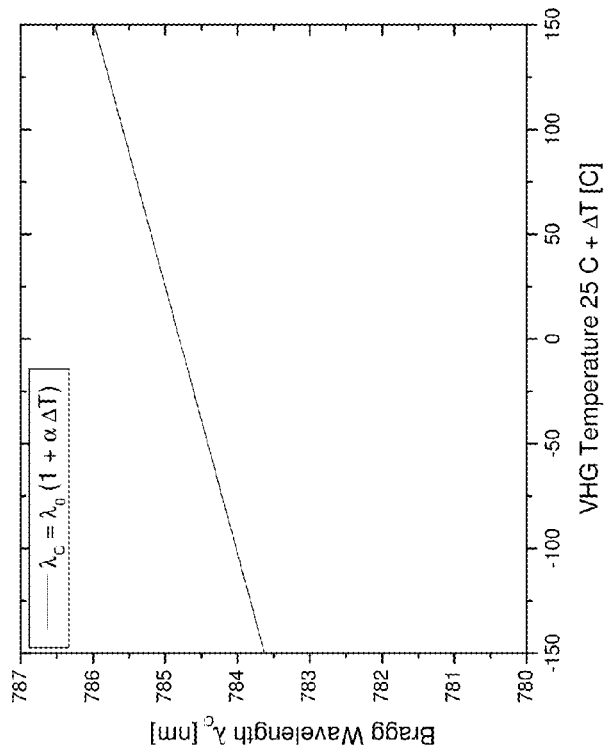
FIG. 4 is an example plot of change of a narrowband VHG filter wavelength $\lambda_C$ as a function of angle $\theta$.

FIGS. 3 and 4 show example typical relationships for these variables in some exemplary embodiments of VHG filters. For a given change in temperature $\Delta T$, one may predetermine or predict the change in filter center wavelength $\Delta \lambda_C$ and, using the angle/wavelength relationship, may determine the required change in filter angle $\Theta_F$ to compensate for (or offset) temperature change $\Delta T$. Accordingly, an adjustment mechanism is provided to deliver the desired rotation/temperature relationship. Example adjustment mechanisms according to various embodiments are described further in relation to FIGS. 5-7 below.

Figure 5:
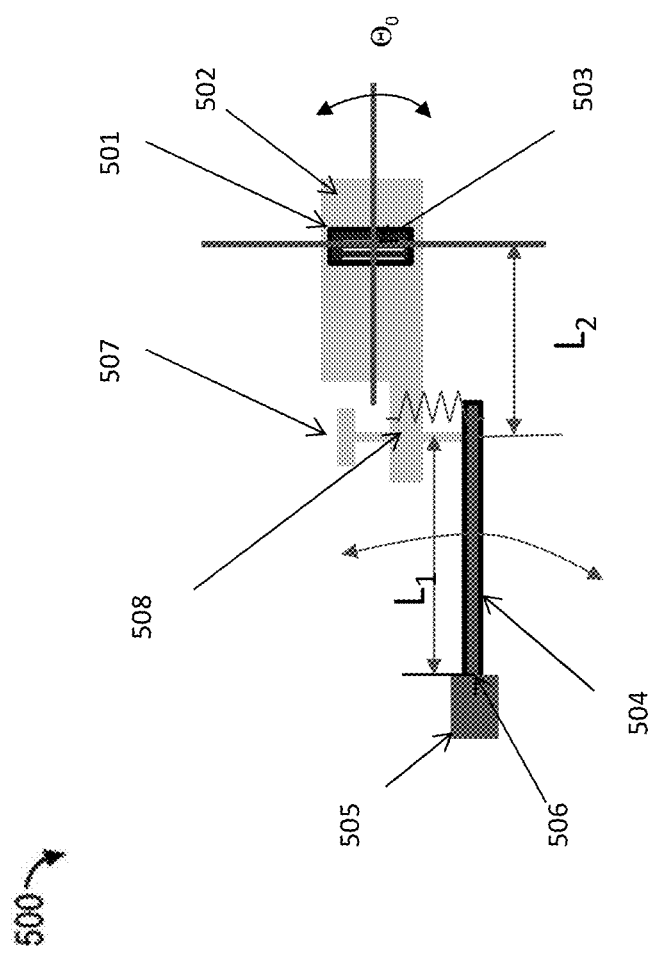
FIG. 5 depicts embodiments of temperature compensating mechanisms.

FIG. 5 illustrates one example of an adjustment mechanism 500 for rotating elements (e.g., in low-frequency Raman spectroscopy system 100) in response to temperature changes. For example, narrowband optical element 501 is beamsplitter 108 (FIG. 1). In some embodiments, the narrowband optical element 501 is mounted on a rotating element 502 with pivot (center of rotation) point 503. The midpoint of the filter may be placed over the center of rotation 503. Arm 504 is affixed to mount 505 at attachment/mounting point 506 and acts as a lever to actuate rotating element 502. In some embodiments, arm 504 is a bi-metallic component. Arm 504 is physically coupled to rotating element 502 so that the contact point (e.g., with screw 507) is at distance $L_1$ from the mounting point 506.

For example, the two metals comprising arm 504 have different coefficients of thermal expansion, resulting in a bending motion with temperature changes (according to a known coefficient of curvature) that will effect a rotation of element 502. By way of further non-limiting example, arm 504 comprises at least one of a high-expansion material or "memory" material such as Nytenol or a Cu—Ni—Al alloy that changes position or shape with temperature in a known and repeatable manner. Adjustment screw 507 is disposed in rotating element 502 at a distance L2 from center of rotation 503 and sets an initial angle of incidence $\Theta_0$. Spring 508 maintains/ensures continuous contact/coupling between screw 507 and component 504 and may act as a preload to inhibit hysteresis effects. As an ambient temperature of system 100 and/or optical probe 103 changes by $\Delta T$, arm 504 curves, effecting a change of angle of incidence $\Theta$ onto the optical element. Varying the ratio L1/L2 provides one exemplary means for adjusting the angle change to match the predetermined grating rotational position change required to maintain spectral alignment.

Lever arm 504 may be affixed to mount 505 at attachment point 506 and acts as a lever to actuate the rotating element. Lever arm 504 is coupled to the rotating element so that the contact point is an adjustable distance $L_1$ from the mounting point. Adjustment screw 507 is positioned in rotating element 502 at a distance L2 from the center of rotation 503, which allows for setting of initial angle of incidence $\Theta_0$. As the temperature changes by $\Delta T$, the lever arm curves/bows, effecting a change of angle of incidence $\Theta$ onto the optical element. In various embodiments, the change in angle occurs according to the relationship:

$$\Theta \approx \Theta_0 + (a/s)(L1^2/L2)\Delta T \tag{3}$$

Where a is the specific deflection (also referred to as DIN 1715 for a bimetallic component) and s is the thickness of the bimetallic component. Varying the ratio L1/L2 allows for adjusting the angle change to match the required grating change with a fixed coefficient of curvature $\alpha$ of bimetallic component 504. Alternatively or additionally, the values of a and s may be varied to achieve the desired angle change characteristics.

Figure 6:
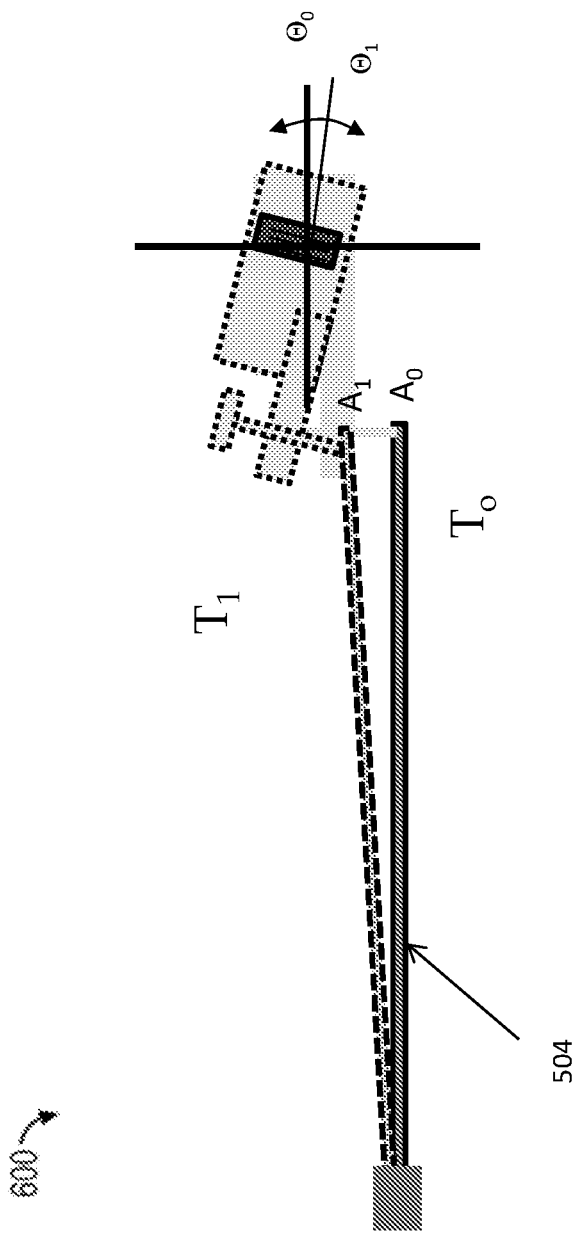
FIG. 6 illustrates operation of embodiments of a temperature compensating mechanism.

FIG. 6 illustrates an example 600 of a path traversed by arm 504 in response to changes in temperature and the associated rotation of the optical mount. With temperature change $\Delta T$ from $T_0$ to $T_1$, arm 504 will bend/curve from position $A_0$ to position $A_1$, resulting in a shift of rotational position from $\Theta_0$ to $\Theta_1$. With temperature changes in the opposite direction (e.g., from $T_1$ to $T_0$), a commensurate shift in position will occur.

Figure 7:
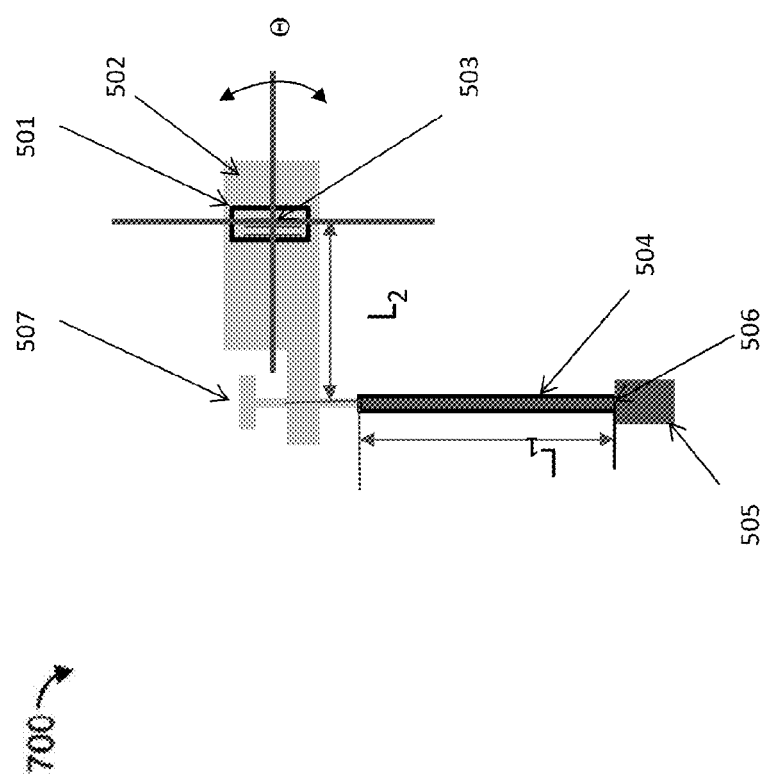
FIG. 7 shows temperature compensating mechanisms according to various embodiments.

FIG. 7 illustrates another embodiment, apparatus 700, where arm 504 (FIG. 5) is a simple beam, or rod that expands and contracts with temperature. In some embodiments the beam or rod (e.g., arm 504) may be made of a material with a known thermal coefficient of expansion ($\alpha$). As the temperature changes (e.g., from $T_0$ to $T_1$), the beam expands or contracts in a predetermined manner, effecting a rotation of the filter:

$$\Theta \approx \Theta_0 + (\alpha - \alpha_{substrate})(L1/L2)\Delta T \tag{4}$$

where $\alpha$ is the linear coefficient of expansion of beam 504 and $\alpha_{substrate}$ is the averaged (effective) linear coefficient of expansion of the material bridge between elements 506 and 503. In various embodiments, the rotating mount or optical element itself may be mounted onto a spiral or curved element. The spiral or curved element may be made of a bi-metallic or memory material. Upon heating or cooling, the spiral element will rotate the mount or the optical element in a predetermined and calculable manner.

When an optical element is rotated (e.g., as in the embodiments of FIGS. 5 and 7) in order to maintain spectral and/or angular relationships, it is also desirable to minimize angular and/or displacement changes in the alignment of the overall beam path. For example, beam displacements advantageously remain within the clear apertures of all optical elements and angular relationships along the path maintained.

FIGS. 8A and 8B illustrate example beam displacements occurring in response to a number n of optical elements being rotated (e.g., as in the embodiments of FIGS. 5 and 7).

In FIG. 8A, entrance beam 1a hits mirrors M1 and M2, which have been aligned so that exiting beam 1b is parallel to entrance beam 1a and exits through the center of an optical element having aperture A. In some embodiments, M1 and/or M2 are narrowband optical elements, wavelength selective optics, or VHGs. In response to an angular shift Θ1 in mirror M1, mirror M1 shifts to position M1a, reflecting the beam at a different angle before hitting mirror M2. If Mirror M2 then shifts Θ2 to position M2a substantially concurrently with Mirror M1 (e.g., the Mirror M2 shift being equal in magnitude and simultaneously with Mirror M1, thereby maintaining a "fixed angular relationship" between them such that Θ2=Θ1), then exiting beam 2b will remain in a fixed angular relationship to the entrance beam 2a at displacement d. In response to displacement d being sufficiently small (e.g., less than ½ the aperture A diameter) the beam will exit through aperture A without loss and at an unchanged angle with respect to the optical axis. This can be critical in an optical system where many optical elements are aligned along the beam axis. However, in FIG. 8B, if mirror M2 undergoes no rotation, or a rotation Θ2≠Θ1, then exit beam 2b will exit Mirror M2 at angle Θ3 relative to the original exit beam 1b, and optical elements will no longer be encountered at the correct angle of incidence, resulting in compromised performance of angle-sensitive optical elements, clipping of the beam, and/or other problems in the downstream optical path.

In some embodiments (as depicted in FIG. 8A), the entrance beam and exit beam are parallel to one another. In various embodiments, Mirrors M1 and M2 are disposed on a common platform such that their angular relationship remains substantially fixed and constant at all times, and rotational adjustments of both elements may be implemented by rotation of only the common platform. The center of rotation of the common platform may be located between the optical elements or underneath either of the elements in order to optimize system parameters and performance, including beam displacements and overall mechanical layout and complexity.

When at least one of M1 and M2 are VHG narrowband optical elements, a change in angle will result in a shift of diffraction efficiency and center (e.g., Bragg) wavelength according to the relationship in FIG. 4. Angular changes are matched to compensate for calculated temperature-induced shifts in center wavelength of the VHG, as described in relation to FIG. 3. When both M1 and M2 are VHGs, it is preferable that they have equal grating spacings and center (or Bragg) wavelengths so as to allow a common mounting platform and synchronous angular rotations.

In some embodiments, the excitation laser energy passing through optical fiber cable 102 may generate a spurious fluorescence or scattering signal that interferes with the low frequency Raman signals collected from the sample. In such cases, the input beam is further filtered using ASE filter assembly 106, or one or more narrowband filters (e.g., mirror or narrowband filters 107 and beamsplitter 108) prior to illuminating or exciting the sample. In embodiments advantageously having multiple narrowband filters, the fixed mirror and/or beam angular relationships are preferably maintained as described above, in order to preserve both spectral alignment/synchronization and beam path clearance/relationships throughout the optical system. In some embodiments, maintaining the fixed mirror and/or beam angular relationships is accomplished when an even number (2n where n>0) of reflections are used in the optical path towards the sample. In various embodiments, a multi-pass (2n reflection) assembly with two or more narrowband elements may be used (for example ASE filter assembly 106), which may also be mounted onto a temperature compensating mechanism.

In some embodiments, laser 101 (FIG. 1) is a fixed wavelength source and narrowband elements in the optical path (e.g., ASE filter assembly 106, mirror or narrowband filter 107, beamsplitter 108, and filtering elements 114) are shifted or rotated by an appropriate amount in order to preserve spectral alignment. For example, for optical probe 103 (FIG. 1), narrowband notch filter elements 114 are mounted on temperature compensating mechanisms, such as those shown in FIGS. 5 and 6, and set such that they will track or maintain the same center wavelength.

In various embodiments, the diffracted or reflected beam (e.g., excitation beam 119 in FIG. 1) from one of the narrowband optical elements (e.g., ASE filter assembly 106) in optical probe 103 may also be used as a feedback source to stabilize the narrowband laser source 101. In some embodiments, a small percentage (e.g., ~10%) of the beam (e.g., excitation beam 119) is reflected directly back through input optical fiber 102 to laser 101. The reflected beam may be directed into a detector to provide feedback for active control of the laser temperature or current, or may be fed directly back into the laser for passive optical stabilization purposes. This has the further advantage of keeping the laser stabilized and synchronized to the center wavelength of the narrowband optical elements while they undergo shifts with temperature.

Figure 9:
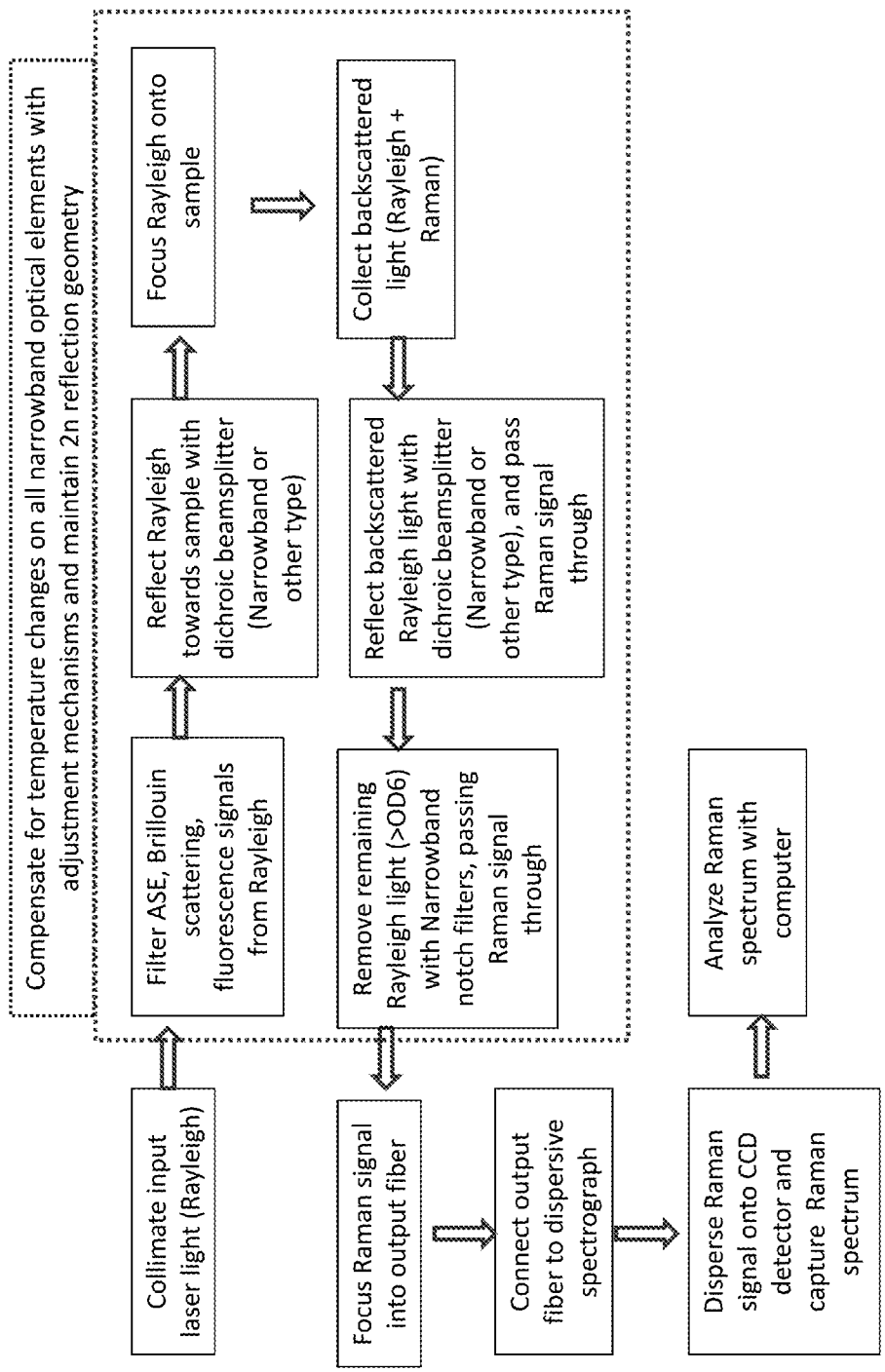
FIG. 9 is a simplified flow diagram for a method in accordance with various embodiments.

FIG. 9 describes a method for consistent optical performance of a low-frequency Raman spectroscopy probe with narrowband optical elements over a wide range of ambient temperatures, according to some embodiments.

What is claimed is:

1. An optical probe comprising:
   a laser source, the laser source having a laser center wavelength;
   at least one narrowband optical element receiving light emitted by the laser source, the narrowband optical element having a filter center wavelength, the narrowband optical element being arranged such that the filter center wavelength is initially spectrally aligned with the laser center wavelength, the filter center wavelength changing in response to a temperature change such that the filter center wavelength is not substantially aligned with the laser center wavelength; and
   a passive adjustment mechanism coupled to the narrowband optical element, the passive adjustment mechanism including an actuator, the actuator moving in response to the temperature change, the actuator motion rotating the narrowband optical element, the rotation compensating for the temperature change such that the filter center wavelength and laser center wavelength remain spectrally aligned.

2. The optical probe of claim 1 wherein the filter center wavelength and the laser center wavelength are spectrally aligned when the filter center wavelength and the laser center wavelength are separated from each other by less than half a difference between a transition width of the narrowband optical element and a linewidth of the laser source.

3. The optical probe of claim 1 wherein the passive adjustment mechanism further comprises a rotating element, the rotating element being coupled to the actuator, the narrowband optical element being disposed on the rotating element.

4. The optical probe of claim 3 wherein the narrowband optical element is disposed on the rotating element such that a midpoint of the narrowband optical element is disposed approximately at a center of rotation of the rotating element.

5. The optical probe of claim 3 wherein the actuator comprises at least one of a bimetallic or memory metal component, the bimetallic or memory metal component contorting in a predefined manner in response to the temperature change, the contortion effecting a rotation of the narrowband optical element turning the rotating element.

6. The optical probe of claim 3 wherein the actuator comprises an arm, the arm comprising a substantially homogeneous material having a coefficient of thermal expansion such that the arm expands or contracts in response to the temperature change, the expansion or contraction turning the rotating element.

7. The optical probe of claim 3 wherein the actuator has a spiral or curved shape and a known movement path with respect to temperature changes, such that the actuator moves in response to the temperature change, the movement turning the rotating element.

8. The optical probe of claim 1 wherein an optical beam path angle is maintained by using at least one pair of rotating optical elements.

9. The optical probe of claim 1 wherein at least one pair of rotating optical elements is mounted to a common rotating element.

10. The optical probe of claim 1 wherein the narrowband optical element is a narrowband diffractive volume holographic grating (VHG) comprising at least one of photosensitive glass, photosensitive polymers, and other photosensitive optical materials.

11. The optical probe of claim 1 wherein the light from the laser source has a wavelength approximately in the range of 300-2,000 nanometers (nm).

12. The optical probe of claim 1 wherein optical feedback from at least one of the narrowband optical elements within the optical probe is optically coupled back to the laser source in order to stabilize and synchronize the laser center wavelength to the filter center wavelength of the narrowband optical element.

13. The optical probe of claim 1 wherein optical feedback from the at least one narrowband optical element is optically coupled to a detector external to the optical probe, the optical feedback including parameters for stabilizing and synchronizing the laser center wavelength to the filter center wavelength of the narrowband optical element.

14. An optical system comprising:
the optical probe of claim 1;
a narrowband laser; and
a detection system, the narrowband laser and detection system being optically coupled via a fiber-optic cable to the optical probe.

15. The optical system of claim 14 further comprising:
a computer, the computer analyzing an optical output of the detection system.

16. An optical system comprising:
a laser source, the laser source having a laser center wavelength;
a first narrowband optical element receiving light transmitted by the laser source, the first narrowband optical element having a first filter center wavelength, the first filter center wavelength being initially spectrally aligned with the laser center wavelength, the first filter center wavelength changing in response to a temperature change such that the first filter center wavelength is not spectrally aligned with the laser center wavelength;

a first passive adjustment mechanism coupled to the first narrowband optical element, the first passive adjustment mechanism including a first actuator, the first actuator moving in response to the temperature change, the first actuator motion rotating the first narrowband optical element, the rotation compensating for the temperature change such that the first filter center wavelength and laser center wavelength remain spectrally aligned;
at least one additional narrowband optical element having a respective filter center wavelength, the respective filter center wavelength being initially spectrally aligned with the laser center wavelength, the respective filter center wavelength changing in response to the temperature change such that the respective filter center wavelength is not spectrally aligned with the laser center wavelength;
an additional passive adjustment mechanism coupled to each additional narrowband optical element, each passive adjustment mechanism including a separate actuator, each separate actuator moving in response to the temperature change, each separate actuator motion rotating an additional narrowband optical element, the rotation compensating for the temperature change such that all the filter center wavelengths and laser center wavelength remain spectrally aligned; and
an optically coupled detection system and computational means for analyzing the filtered optical signals.

17. The optical system of claim 16 wherein an optical beam path angle is maintained by using at least one pair of rotating optical elements.

18. The optical system of claim 16 wherein
a second narrowband optical element and the first narrowband optical element are initially positioned such that their reflective surfaces are approximately parallel to each other; and
respective rotations of the first and second narrowband optical elements are such that the reflective surfaces of the first and second narrowband optical elements remain approximately substantially parallel to each other.

19. The optical system of claim 16 wherein at least one pair of rotating optical elements is mounted to a common rotating element.

20. The optical system of claim 16 wherein the first filter center wavelength, a second filter center wavelength, and the laser center wavelength are spectrally aligned when the filter center wavelengths and the laser center wavelength are separated from each other by less than half a difference of a transition width of the narrowband optical elements and a linewidth of the laser source.

21. The optical system of claim 16 wherein at least one of the first and second passive adjustment mechanisms each further comprises a rotating element, the rotating element being coupled to the actuator, the narrowband optical element being disposed on the rotating element.

22. The optical system of claim 21 wherein at least one of the first and second narrowband optical elements is disposed on the rotating element such that a respective midpoint of at least one of the first and second narrowband optical elements is disposed approximately at a center of rotation of the rotating element.

23. The optical system of claim 21 wherein at least one of the first and second actuators comprises a bimetallic component, the bimetallic component comprising two metals having different coefficients of thermal expansion such that the bimetallic component contorts in response to the temperature change, the contortion turning the rotating element.

24. The optical system of claim 21 wherein at least one of the first and second actuators comprises an arm, the arm comprising a homogeneous material having a known coefficient of thermal expansion such that the arm expands or contracts in response to the temperature change, the expansion or contraction turning the rotating element.

25. The optical system of claim 21 wherein at least one of the first and second actuators has a spiral shape and a known movement path with respect to temperature changes, such that the actuator moves in response to the temperature change, the movement turning the rotating element.

26. The optical system of claim 16 wherein at least one of the first and second narrowband optical elements is a narrowband diffractive volume holographic grating (VHG) comprising at least one of photosensitive glass, photosensitive polymers, or other photosensitive materials.

27. The optical system of claim 16 wherein a bandwidth of at least one of the narrowband optical elements in an excitation beam path is less than a bandwidth of the narrowband optical elements disposed in a path of reflected light.

28. A method for temperature compensated spectroscopy comprising:
   initially arranging a narrowband optical element such that a filter center wavelength of the narrowband optical element is initially spectrally aligned with a laser center wavelength of a laser source;
   receiving light emitted by the laser source;
   filtering the light by the narrowband optical element;
   undergoing a temperature change, the filter center wavelength changing in response to the temperature change such that the filter center wavelength is not substantially aligned with the laser center wavelength; and
   passively rotating the narrowband optical element by an actuator in response to the temperature change, the rotation compensating for the temperature change such that the filter center wavelength and laser center wavelength remain spectrally aligned.

29. The method of claim 28 wherein the filter center wavelength and the laser center wavelength are spectrally aligned when the filter center wavelength and the laser center wavelength are separated from each other by less than half a difference between a transition width of the narrowband optical element and a linewidth of the laser source.

30. The method of claim 28 wherein the rotating the narrowband optical element is rotating a rotating element, the actuator being coupled to the rotating element, and the narrowband optical element being disposed on the rotating element.

31. The method of claim 30 wherein the narrowband optical element is disposed on the rotating element such that a midpoint of the narrowband optical element is disposed approximately at a center of rotation of the rotating element.

32. The method of claim 30 wherein the actuator comprises at least one of a bimetallic or memory metal component, the bimetallic or memory metal component contorting in a predefined manner in response to the temperature change, the contortion effecting a rotation of the narrowband optical element turning on the rotating element.

33. The method of claim 30 wherein the actuator comprises an arm, the arm comprising a substantially homogeneous material having a coefficient of thermal expansion such that the arm expands or contracts in response to the temperature change, the expansion or contraction turning the rotating element.

34. The method of claim 30 wherein the actuator has a spiral or curved shape and a known movement path with respect to temperature changes, such that the actuator moves in response to the temperature change, the movement turning the rotating element.

35. The method of claim 28 further comprising:
   maintaining an optical beam path angle using at least one pair of the rotating optical elements.

36. The method of claim 28 further comprising:
   providing optical feedback from the narrowband optical element to a detector, the optical feedback including parameters for stabilizing and synchronizing the laser center wavelength to the filter center wavelength of the narrowband optical element.

* * * * *